United States Patent
Feibleman et al.

(10) Patent No.: US 12,382,966 B1
(45) Date of Patent: Aug. 12, 2025

(54) DEVICES, SYSTEMS, AND METHODS FOR EXTRUDING CLEAN-MEAT MATERIALS

(71) Applicants: Dorothy Feibleman, Tokoname (JP); Hiromichi Ito, Seto (JP)

(72) Inventors: Dorothy Feibleman, Tokoname (JP); Hiromichi Ito, Seto (JP)

( * ) Notice: Subject to any disclaimer, the term of this patent is extended or adjusted under 35 U.S.C. 154(b) by 6 days.

(21) Appl. No.: 17/505,621

(22) Filed: Oct. 19, 2021

Related U.S. Application Data

(63) Continuation-in-part of application No. 16/828,943, filed on Mar. 24, 2020, now Pat. No. 11,148,338, which is a continuation-in-part of application No. 15/079,088, filed on Mar. 24, 2016, now Pat. No. 10,598,283.

(60) Provisional application No. 62/137,555, filed on Mar. 24, 2015.

(51) Int. Cl.
| | |
|---|---|
| *A22C 7/00* | (2006.01) |
| *A22C 17/00* | (2006.01) |
| *A23C 17/00* | (2025.01) |
| *A23J 3/20* | (2006.01) |
| *A23J 3/26* | (2006.01) |
| *A23L 13/00* | (2016.01) |

(52) U.S. Cl.
CPC .......... *A22C 7/0007* (2013.01); *A22C 7/0023* (2013.01); *A22C 17/00* (2013.01); *A23J 3/26* (2013.01); *A23L 13/00* (2016.08)

(58) Field of Classification Search
CPC ..... A22C 7/0007; A22C 7/0023; A23L 13/00; A23P 30/20; A23P 30/25; A23J 3/26; A23J 3/265
See application file for complete search history.

(56) References Cited

U.S. PATENT DOCUMENTS

| | | | | |
|---|---|---|---|---|
| 3,814,823 | A * | 6/1974 | Yang et al. | A23J 3/26 426/802 |
| 3,834,849 | A * | 9/1974 | Supran | B29C 48/12 426/516 |
| 4,834,999 | A * | 5/1989 | Matthews | A23P 30/25 426/516 |
| 4,954,061 | A * | 9/1990 | Repholz | A21C 11/163 99/450.6 |
| 2005/0084958 | A1* | 4/2005 | Vein | A23L 13/50 435/325 |
| 2006/0029922 | A1* | 2/2006 | Van Eelen | A23L 13/00 452/1 |

(Continued)

FOREIGN PATENT DOCUMENTS

EP 1589098 A1 * 10/2005 .......... C12N 5/0697

OTHER PUBLICATIONS

Erickson-Davis. "Lab-grown meat: a taste of the future?" Jun. 3, 2014. <https://news.mongabay.com/2014/06/lab-grown-meat-a-taste-of-the-future/>. Accessed Nov. 30, 2023. (Year: 2014).*

(Continued)

*Primary Examiner* — Ericson M Lachica
(74) *Attorney, Agent, or Firm* — Reichel Stohry Dean LLP; Natalie J. Dean

(57) ABSTRACT

A barrel-shaped sealing device with a resilient protruding edge for producing extruded meat products is provided. Methods are also provided for producing extruded food products, including cell-based meat products, as are extruded food products resulting from such methods.

10 Claims, 23 Drawing Sheets

(56) References Cited

U.S. PATENT DOCUMENTS

| | | | | |
|---|---|---|---|---|
| 2006/0121006 A1* | 6/2006 | Chancellor | ............ | A61K 35/35 435/325 |
| 2009/0255419 A1* | 10/2009 | Kirsch | ............... | A22C 17/0006 62/380 |
| 2013/0029008 A1* | 1/2013 | Forgacs | ............... | C12N 5/0697 426/55 |
| 2014/0271994 A1* | 9/2014 | Smittle | .................. | A23L 13/48 426/63 |
| 2015/0004142 A1* | 1/2015 | Caldwell | ................ | A61K 8/602 424/93.7 |
| 2015/0044334 A1* | 2/2015 | Walther | .................. | A23P 30/20 426/63 |
| 2015/0079238 A1* | 3/2015 | Marga | ..................... | A23P 10/20 426/577 |

OTHER PUBLICATIONS

Oskay. "The ultimate iron chef—when 3D printers invade the kitchen." Oct. 14, 2013. <https://theconversation.com/the-ultimate-iron-chef-when-3d-printers-invade-the-kitchen-17626>. Accessed Nov. 30, 2023. (Year: 2013).*

* cited by examiner

1950

DEVICES, SYSTEMS, AND METHODS FOR EXTRUDING CLEAN-MEAT MATERIALS

PRIORITY

The present application is related to, a U.S. continuation-in-part application, and claims priority benefit of U.S. patent application Ser. No. 16/828,943 to Feibleman filed Mar. 24, 2020 and which issues as U.S. Pat. No. 11,148,338 on Oct. 19, 2021, which is a continuation-in-part of U.S. patent application Ser. No. 15/079,088 to Feibleman filed Mar. 24, 2016 and issued as U.S. Pat. No. 10,598,283 on Mar. 24, 2020, which is related to and claims the priority benefit of U.S. Provisional Patent Application Ser. No. 62/137,555, filed Mar. 24, 2015. The contents of the aforementioned applications and patents are hereby incorporated by reference in their entireties into this disclosure.

BACKGROUND

The world population is exceedingly large and continues to grow. As the population grows, there is increasing concern about the potential for protein shortage in the future. However, society's need to curb carbon dioxide emissions has made it difficult to adopt social policies that would allow for the traditional livestock industry to continue to expand in scale to meet this growing demand.

One of the most promising solutions in recent years has been meat substitutes such as plant-based meat (PBM) and cell-based meat (CBM). For example, patties made from plant-derived meat alternatives, such as soybeans, have been proposed. Cultured meat, which is made by cultivating animal-derived cells, exhibits strong potential for being adopted by the traditional food culture of people worldwide, and the market has high expectations.

Nevertheless, both PBM and CBM face major hurdles in the pursuit of widescale adoption. While both have made strides in mimicking the appearance and flavor of animal-based meat products, achieving acceptable sensory characteristics and flavor profiles are key challenges. For reference, sensory characteristics refers to features such as texture (e.g., chewiness) and displaying an appetizing appearance.

Extruders are useful tools for forming a variety of artwork and sculptures, including clay-based artwork and products. When operated correctly, an extruder should form an extruded product (i.e., an extrusion) with a substantially constant cross-section. However, due to variations in shape between separate pieces in a clay extruder, gaps can form that interrupt the consistency of the cross-section of an extrusion. Small gaps may exist between the barrel and the piston when the shape of the piston does not match exactly with the inner surface of the barrel extruder, thereby allowing clay to "leak-back" behind the piston during extrusion. Small gaps may also exist between the end of the barrel and an attached die. Clay may also exit through these gaps as the clay is being extruded, creating an inconsistent extrusion. Typically, when uniform clay or other extrudable material is utilized, some degree of inconsistency can be tolerated; however, in more sophisticated arts, a uniform extrusion is essential as the material placed into the extruder is strategically constructed from many different types/colors of the material, and therefore conventional extruders are unacceptable for use in such techniques. Therefore, it is desirable to have a device that seals the various gaps that are present in the barrel of an extruder to produce as consistent a cross-section of material as possible for an extrusion.

There remains a need for further contributions in both the extruder and meat production areas of technology. It would be beneficial to leverage an extruder with meat products to produce meat products (e.g., PBM and/or CBM products) that offer an appetizing appearance similar to animal-based meat products and that also have a sufficient texture. Furthermore, it would be advantageous if the methods could be scalable, decrease the risk of contamination, and/or function in a low or zero gravity environment such that they could be utilized off-planet such as in a lunar base or a space station.

SUMMARY

The present disclosure includes certain embodiments, for operating in conjunction with an extrusion assembly that include a sealing device and/or one or more sealing rings for use in closing gaps which typically exist in the barrel of an extrusion assembly and extend the inner surface of the barrel all the way to the die.

One representative extrusion assembly is a barrel type extrusion assembly, such as those which are commonly mounted to a Wall for use in clay extrusion. The extrusion assembly includes a clutch system that may slide on a bar. A piston lever is attached to the extrusion assembly so that applying force upward or downward on the lever causes the clutch system and lever to slide along the bar. A piston assembly is connected to the piston lever so movement of the lever also causes the piston assembly to move. Alternately, a screw type piston or a powered piston may be utilized.

The extrusion assembly also includes a barrel with an opening in the top of the barrel into which extrudable material may be inserted. A base cap is attached to the bottom of the barrel. The base cap has an opening that accepts a die through which the extrudable material is pushed. The die has an opening designed to achieve the desired shape. The piston assembly may be inserted in the opening at the top of the barrel after the extrudable material and the die have been inserted. A user operates the extrusion assembly by pushing downward on the piston lever, so that the piston assembly slides downward through the barrel and pushes the extrudable material through the die mounted within the base cap.

Gaps may form in several areas of the barrel that affect the consistency of the extrusion when extrudable material is undesirably forced through these gaps. One of these gaps may exist between the inner surface of the barrel and the piston if the piston has a smaller diameter than the inner diameter of the barrel. Another gap may form between the bottom surface of the barrel and the bottom surface of the base cap.

In one form, a barrel seal with a resilient protruding edge may be inserted between the piston and the extrudable material. The protruding edge has a diameter equal to or just greater than the inner diameter of the barrel so that no gap exists between the barrel seal and the barrel. This protruding edge prevents extrudable material from entering a gap between the piston and the barrel.

Sealing rings may be inserted into the gap between the bottom surface of the barrel and the corresponding surface of the base cap. Multiple rings may be stacked on top of each other to fill the entire gap. The rings have roughly the same diameter as the barrel and are held in place by compression force between the barrel and the base cap.

In another embodiment, the barrel seal may be used after a completed extrusion cycle to clean the interior of the barrel by removing any remaining material after an extrusion cycle. The user removes the base cap from the barrel and clears the barrel of any loose extrudable material. The barrel seal is then inserted into the opening at the top of the barrel and the piston assembly is used to push the barrel seal through the length of the barrel. The protruding edge of the barrel scrapes the inner surface of the barrel and removes any excess extrudable material that is stuck on the barrel.

Further objects, features and advantages of the present disclosure will become apparent from the detailed drawings and descriptions provided herein. Each embodiment described is not intended to address every object described herein, and each embodiment does not include each feature described. Some or all of these features may be present in the corresponding independent or dependent claims, but should not be construed to be a limitation unless expressly recited in a particular claim.

Other embodiments of the present disclosure provide an extruder system comprising at least one extruder comprising a barrel having a barrel width structured to contain and pass an extrudable material, a piston assembly comprising a piston structured to fit at least partially within the barrel, and a body disposed within the barrel between the extrudable material and the piston. The piston assembly is configured to push the extrudable material through the barrel upon activation. Further, the body may comprise a first planar end and an opposing second planar end, with the first planar end being substantially parallel to the second planar end. The body may additionally comprise a lip extending radially from the body at or near the second planar end to define an edge, with the edge defining a first width and the lip comprising a resilient material. In such embodiments, the body supports the lip and enables the edge of the lip to flex. Further, the first width may be nearly the same as the barrel width, and the body may be releasably coupled with the piston such that the body is released from the piston when sufficient force is applied to the piston in a direction away from the body.

In certain embodiments of the extruder system, the at least one extruder may further comprise a fastener affixed to the first planar end at or near a centroid of the first planar end. The fastener may be structured to releasably attach the body to the piston and to release the body from the piston when the sufficient force is applied to the piston in the direction away from the body.

At least one of the extruders of the system may optionally comprise a cap. The cap may be structured to reversibly attach to an end of the barrel and to secure an extrusion die at the end. In at least one exemplary embodiment, the extruder may also comprise at least one spacer ring disposed between the end of the barrel and the cap. The at least one spacer ring may be configured to fill a gap formed between the end of the barrel and a bottom surface of the cap. In this manner, when downward pressure is applied to an extrudable material positioned within the barrel, a vortex is created within the extrudable material at or near the extrusion die. In certain embodiments comprising spacer ring(s), the at least one spacer ring includes opposing protrusions and grooves configured to engage one another such that multiple spacer rings are aligned when stacked one to another with the protrusion of one spacer ring engaging the groove of an adjacent spacer ring.

In at least one exemplary embodiment of the extruder system, the at least one extruder comprises a plurality of extruders. Furthermore, optionally, the piston assembly of each extruder may be activated through the application of compressed air (which may be applied across the extruders of the system in concert, series, independently or as otherwise desired). Alternatively, the piston of the piston assembly may be coupled with a lever and the piston assembly may be activated through application of force to the lever (which may be applied across the extruders of the system in concert, series, independently or as otherwise desired). It will be appreciated where force is applied to the system components in concert or series or other organized pattern, computers, processors and the like may be employed to drive this application as is known in the art.

Methods of extruding material (e.g., meat material and/or CBM) are also provided. In at least one embodiment, a method of the present disclosure comprises: providing at least one extruder, each of the at least one extruders comprising: a barrel comprising a feed end, an extrusion end opposite the feed end, and a barrel width extending between the feed end and the extrusion end, the width structured to contain and pass an extrudable material, a piston assembly comprising a piston structured to fit at least partially within the barrel, the piston assembly configured to push the extrudable material through the barrel upon activation, a body disposed within the barrel between the extrudable material and the piston, wherein the body comprises a first planar end and an opposing second planar end, the first planar end being substantially parallel to the second planar end, and a lip extending radially from the body at or near the second planar end to define an edge, the edge defining a first width and the lip comprising a resilient material, and a die disposed at the extrusion end of the barrel. In this embodiment, the body may support the lip enabling the edge of the lip to flex, the first width may be nearly the same as the barrel width, and the body may be releasably coupled with the piston such that the body is released from the piston when sufficient force is applied to the piston in a direction away from the body. The method may further comprise the steps of placing material in a feed end of the barrel of the extruder; placing the body in the feed end of the barrel adjacent the material such that the body is behind the material relative to the extrusion end; applying a force to the first planar end of the body to extrude the material from the extrusion end of the barrel through the die; and creating a vortex within a core region of the material within the barrel.

In certain embodiments, the material may comprise at least a first layer and a second layer stacked together. The first layer may comprise at least a first material arranged in a first configuration and the second layer comprising at least a second material arranged in a second configuration. Certain embodiments of the presently disclosed methods may further comprise preparing the material as desired (e.g., in particular patterns and/or stacked layers). For example, and without limitation, the first layer may comprise a first clay having a first color and a second clay having a second color and/or comprise a first configuration comprising a starburst configuration or any other patterned configuration (e.g., a pattern achieved through extrusion, a hotdog configuration, a striped configuration, etc.).

Additionally or alternatively, the second layer may comprise the first clay and the second clay and the second configuration comprises the first clay layered over the second clay. Indeed, the material may comprise any design desired, including a plurality of first and second layers, each stacked together in a repeating pattern. Furthermore, one or both of the first clay and the second clay may comprise a unitary color (i.e. a consistent color throughout). Additional embodiments of the method may comprise the steps of cutting the extruded material into segments and firing the segments. Still further, additional method steps may comprise slicing the extruded material into segments and deairing and/or compressing the segments (this may occur in lieu of, before, or after firing as desired). Inventive tile products are also provided. In at least one embodiment, a novel tile having a pattern made by an extruder system of the present disclosure is provided, such pattern comprising at least two materials of different colors disposed in a stacked arrangement, wherein at least one of the at least two materials defines a central pattern on the tile. Such tile may comprise an extruded tile, an acoustic tile, and/or at least one of the at least two materials may comprise ceramic clay, translucent clay, or both. In at least one exemplary embodiment, the pattern overlays the pre-molded or extruded tile. In certain embodiments, the at least two materials may be molded materials disposed in a first stacked arrangement, subjected to a vortex created within an extrusion end of the extruder device, and extruded through a die in the extrusion end of the extruder device to result in a molded body. The resulting molded body may be optionally fired and/or comprise a millefiori pattern or another extruded imaging pattern achieved using sequencing of at least the first stacked arrangement.

In certain embodiments, a method of producing a food product using at least one extruder assembly 10 of the present disclosure is provided. Such method can also be performed using an industrial system comprising a plurality of the extruder assemblies working in concert or otherwise. For example, where extruded material from a first group of extruder assemblies is fed into a second group of extruder assemblies for additional processing.

In certain embodiments, a method of producing a food product using at least one extruder assembly comprises placing material in a feed end of the barrel of the extruder assembly and placing the body in the feed end of the barrel adjacent to the material such that the body is behind the material relative to the extrusion end. The material can comprise any extrudable food-based material including, for example, plant matter, meat or components thereof (including cell-cultured meat, skeletal tissue, blood vessels, etc.), fatty particles, additives, excipients, carriers, binders, and/or nutritional additives such as one or more vitamins, minerals, fiber, or other nutrient-based additives. In certain embodiments, the material comprises a first muscle cell medium comprising a plurality of muscle fibers.

Force is then applied to the first planar end of the body to extrude the material from the end of the barrel through an extrusion die attached to an extrusion end of the barrel, and a vortex is created within a core region of the material within the barrel. Where the material comprises a fiber-based material (e.g., comprises muscle fibers), creating the vortex within the core region substantially aligns the plurality of fibers within the extruded material in a common orientation. In certain embodiments, the extruded material is a cell-based meat product. In certain embodiments, the extruded material visually resembles a beef steak and has mouthfeel characteristics (i.e. a texture and density) similar thereto. The method can further comprise the step of slicing the extruded material into segments (e.g., steaks having a desired thickness). In certain embodiments, the method further comprises de-airing the segments; compressing the segments; or both de-airing and compressing the segments.

The material to be extruded can comprise at least a first layer and a second layer stacked together as described herein. It will be appreciated that any number of layers can be utilized including, without limitation, a plurality of first and second layers, each stacked together in a repeating pattern. In certain embodiments, the material further comprises at least a third layer comprising skeletal tissue and/or a fibrous tissue medium (e.g., comprising skeletal tissue, cells, fascia, or the like).

In certain embodiments, the first layer comprises at least a first muscle cell medium arranged in a first configuration and a second layer comprising at least a fatty particle medium arranged in a second configuration. A fatty particle medium can comprise adipose cells or tissue, lipids, and/or the like. In certain embodiments, the fatty particle medium comprises a variety of fatty particles having a variety of sizes/diameters. In certain embodiments, the fatty particle medium further comprises one or more nutritional additives such as one or more vitamins, minerals, fiber, or other nutrient-based additives.

The material to be extruded can be room-temperature, frozen, or semi-frozen. It will be understood that, in food production, it may be desirable for the initial material to be frozen to reduce contamination risks, for example.

Extruded food products are also provided. In certain embodiments, the extruded food product comprises at least a first material comprising a cultured muscle cell medium comprising muscle fibers positioned in a substantially common orientation and at least a second material comprising fatty particles. In certain embodiments, the first material can further comprise a reinforcing substance that stiffens the muscle fibers as compared to their native/wild-type state.

The first and second materials can define at least a central pattern on the extruded food product. In certain embodiments, the second material can be streaked, distributed, or both throughout the first material in a manner that resembles distribution of intramuscular fat (i.e. marbling) in a meat product derived from a natural animal.

This central pattern can be created by the vortex effect within the barrel when the extruder assembly is operated (as described above). For example, when the first and second materials are disposed in a first stacked arrangement, subjected to a vortex created within an extrusion end of an extruder device, and extruded through a die in the extrusion end of the extruder device to result in an extruded body, it can result in the marbled appearance.

In certain embodiments, the second material is dispersed throughout the first material due to the vortex effect and thixotropy. For example, where the second material comprises fatty particles, the fatty particles are dispersed throughout the first material (e.g., a cultured cell meat medium).

The first and/or second materials of the extruded food product can further comprise a reinforcing substance such as collagen, other binding proteins, or as otherwise may be known in the relevant arts or hereinafter determined. For example, cellulose nanofibers, chitosan nanofibers, and others can additionally be employed. Where the material comprises muscle fibers, the reinforcing substance can act to stiffen the muscle fibers where employed. Additionally or alternatively, the first and/or second materials of the extruded food product can comprise one or more nutritional additives.

In certain embodiments, the extruded food product further comprises a third material comprising skeletal tissue such as fascia.

BRIEF DESCRIPTION OF THE DRAWINGS

FIG. 15b showing a schematic of the construction process for cultured steak, with the first step being cell purification of tissue from cattle to obtain bovine satellite cells (bSCs) and bovine adipose-derived stem cells (bADSCs), the second step supporting bath-assisted 3D printing (SBP) of bSCs and bADSCs to fabricate the muscle, fat, and vascular tissue with a fibrous structure, and the third step being the assembly of cell fibers to mimic the commercial steak's structure (*SVF=stromal vascular fraction);

DETAILED DESCRIPTION

Figure 1:
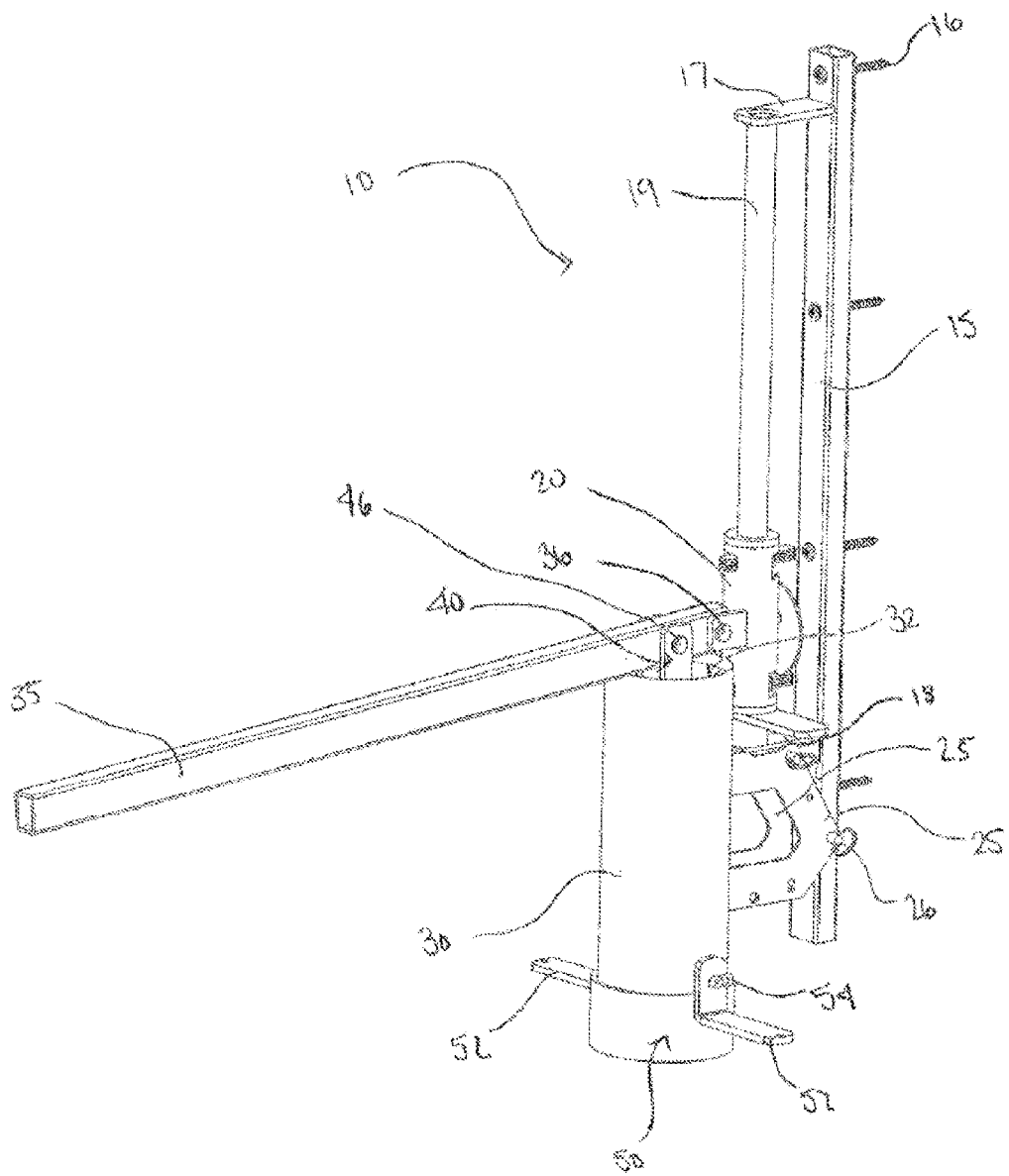
FIG. 1 is a perspective view of an extrusion assembly according to exemplary embodiments of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Additionally, in the following description, like reference characters designate like or corresponding parts throughout the several views.

The term "about," as used herein, means approximately, in the region of, roughly or around. When the term "about" is used in conjunction with a numerical range, it modifies that range by extending the boundaries above and below the numerical values set forth. In general, the term "about" is used herein to modify a numerical value above and below the stated value by a variance of 10%. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, and 5). It is also t be understood that all numbers and fractions thereof are presumed to be modified by the term "about."

The present disclosure relates generally to devices for achieving a consistent extrusion using a conventional extrusion device and for sealing and cleaning the extruder device. The devices of the disclosure enable a consistent extrusion of material and include ring seals and a device for applying uniform pressure on the material and for removing excess material from the extruder after use.

One form of art for which the described devices are necessary for use with certain clay extruders is called Nerikomi. Nerikomi is a traditional Japanese technique for creating ceramic pottery with multiple colored clays. Historically, Nerikomi was performed by hand using slabs of different clays or clays colored with stains or oxides, are stacked, folded, pressed into logs. Slices of the log are then shaped into the desired piece, such as a vessel or plate. In this way, the numerous stacked layers appear as fine undulating lines embedded in a surrounding color in the finished article.

One variation of Nerikomi similarly utilizes slabs (or loads) of different clays or clays colored with stains or oxides, which are strategically stacked, folded, pressed into shape so as to achieve a desired pattern or result when the load is extruded through an extruded. The resulting extruded materials are then formed into the desired shape, such as by using a potter's wheel, or the like. In this variant of Nerikomi, a smooth and consistent extrusion is critical as any variations in the fluid dynamics of the clay will result in undesirable variations in the pattern of colors present in the extruded material. To achieve a consistent and predictable extrusion, any gaps between the components of the extruder that allow material to leak from the extruder must be eliminated. Nerikomi or clay which has structural images (such as millefiori) in the extrusion has not been accomplished before using ceramic clay and a conventional extruder to the knowledge of the inventor.

Figure 8A:
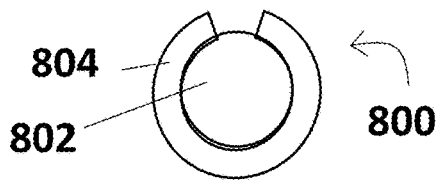
FIGS. 8A-8J show the conventional process of producing millefiori patterns in clay by hand.
Figure 8B:
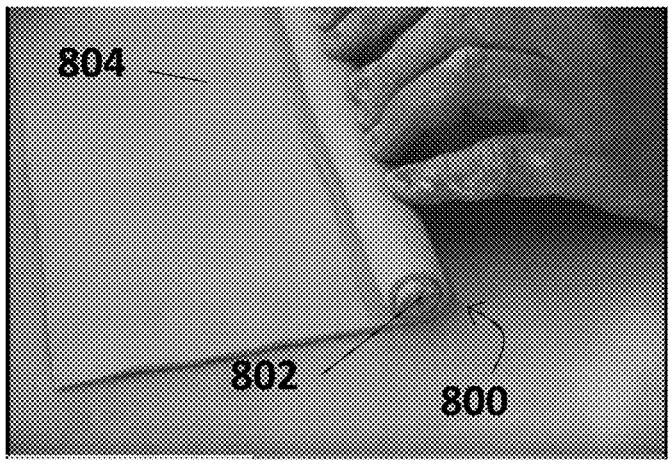
Figure 8C:
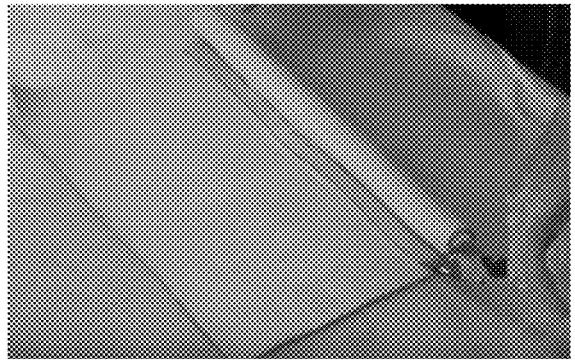
Figure 8D:
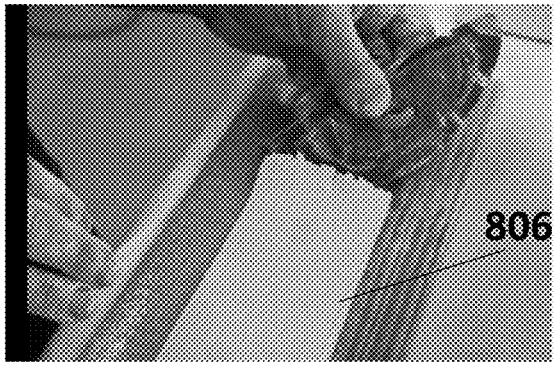
Figure 8E:
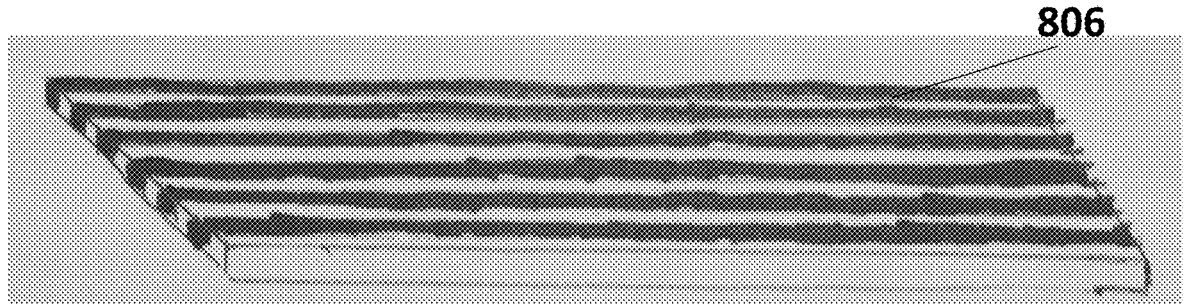
Figure 8F:
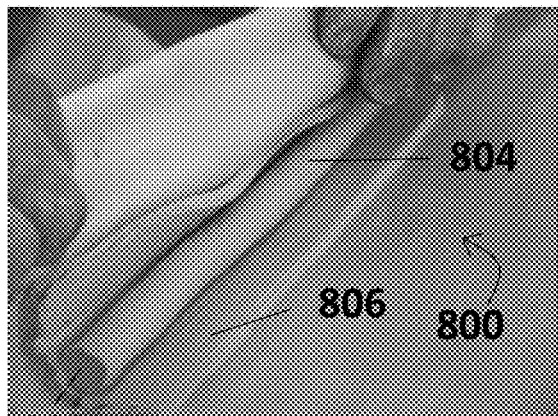
Figure 8G:
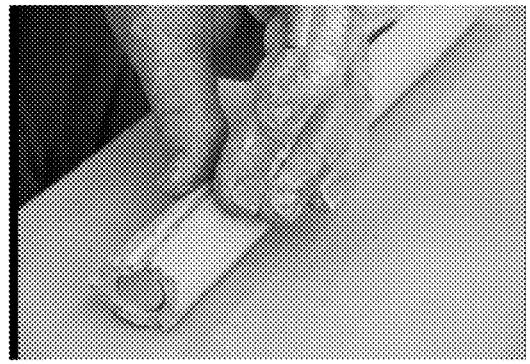
Figure 8H:
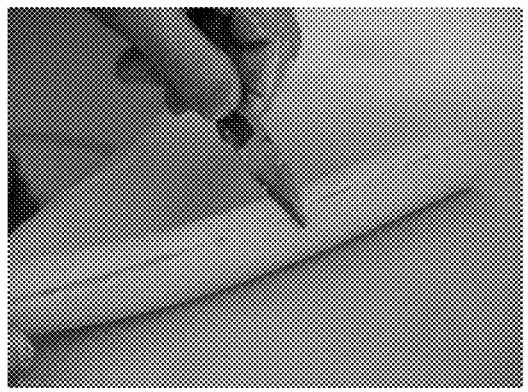
Figure 8I:
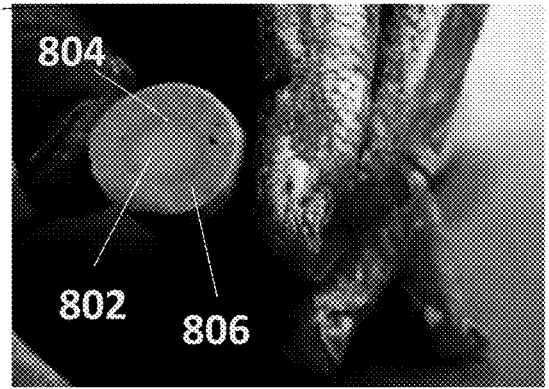
Figure 8J:
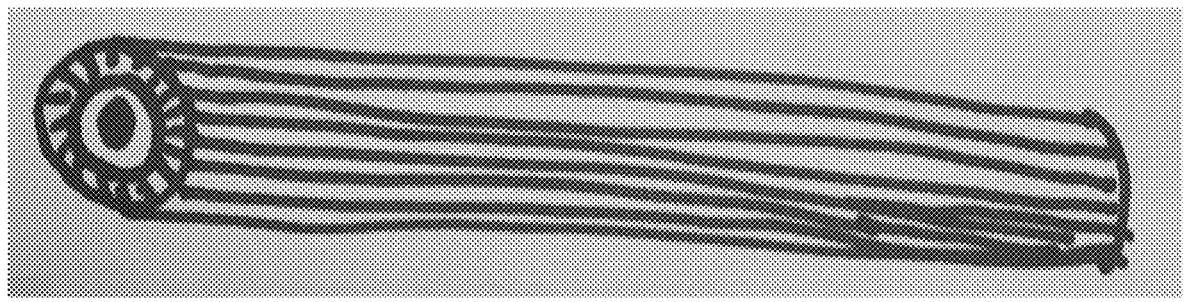

Now referring to FIGS. 8A-8J, the well-known steps of a conventional millefiori technique, which typically employs decorative bodies also called millefiori, are illustrated. The technique first requires the preparation of each decorative body individually and by hand (i.e. the millefiori being handmade from various-colored ceramic clays)-primarily, multiple clay pieces 802, 804 (usually comprising different colors) are prepared into a rod 800 as desired. For example, as shown in FIGS. 8B and 8C, a rod shaped first clay 802 is wrapped in a sheet of second clay 804 to create a pattern within the combined clays (see, e.g., the cross-section of the rod 800 in FIG. 8B). A third clay piece 806 (and, optionally, more additional clay pieces) may also be employed. As shown in FIGS. 8D and 8E, here the third clay piece 806 comprises two clay colors formed into a sheet. This third clay piece 806 is then wrapped around the outside of the previously formed clay pieces 802, 804 to further expand the diameter of the rod 800 (see FIGS. 8F and 8G). The rod 800 is then cut to display the pattern within the cross-section of the rod 800 (see FIGS. 8H-8J). In this manner, the multiple clay pieces 802, 804, 806 formed together by hand through this multiple step process effect a detailed pattern. The resulting rod 800 is then cut into thin slices, typically about 3 to 5 mm thick, which include multicolored spots/patterns in the cross-section (see FIGS. 8I and 8J), thus creating an impression of flowers or other complex motifs, which has given the aforementioned production method the name millefiori-a thousand flowers. If desired, thin slices can be aligned side by side to create a sheet, rolled to combine and/or flatten and affixed on a core surface, such as a bowl or the like. Optionally, the final product can be consistently processed, but the color pattern typically remains the same. In this manner, decorative items are obtained, which are decorated by handmade, multicolored, decorative millefiori, sealed in a practically unchanged form on the surface.

The devices and methods of the present disclosure enable a user to achieve the desired consistent and predictable extrusion using a conventional extruder. Such extrusions can consistently display complex millefiori-like patterns in a clear, reproducible, and consistent matter. Furthermore, such techniques can be employed to create consistent and cost-effective tiles and other materials that comprise two or more materials designed to facilitate acoustic and/or light applications.

In additional embodiments, the devices and methods hereof can be used to produce food products (e.g., clean-meat products, animal-based meat products, or plant-based products). As used herein, "clean-meat" means both plant-based meat (PBM) and cell-based meat (CBM) products. The devices and systems hereof are especially advantageous in producing clean-meat products, and CBM products in particular, that display a natural meat pattern that can be reproduced in a clear and consistent matter that mimics the appearance natural animal-based meat. Further, such techniques can produce food products that have a pleasing texture and consistency. The food production methods hereof are scalable using the devices and systems described herein. Additionally, the devices, systems and methods hereof can be used/performed in a food supply chain that requires a sanitary, food-safe and/or contaminant-free environment, and allow for the mixing of ingredients prior to extrusion such that multiple devices are not required for the different additive components.

FIG. 1 shows an embodiment of a conventional extrusion assembly 10. Extrusion assembly 10 may include an extruder mount 15, a clutch system 20, barrel supports 25, a barrel 30, a piston lever 35, a piston system 40 and a base cap 50. The extrusion assembly 10 shown in FIG. 1 is merely an exemplary extruder. Alternative embodiments of extrusion assemblies may have different sizes, shapes, assemblies for mounting and different methods of moving the piston system within the barrel. In certain embodiments, one or more portions of the extrusion assembly 10 can be formed of stainless steel. In certain embodiments, one or more portions of the extrusion assembly 10 can be formed of molded plastic and/or silicon.

Extruder mount 15 attaches extrusion assembly 10 to a surface, such as a wall, with screws 16. A top bar support 17 and a bottom bar support 18 extend from extruder mount 15. A shaft 19 extends between top bar support 17 and bottom bar support 18. Barrel supports 25 are attached to and extend from a lower portion of extruder mount IS. Barrel supports 25 are connected by a pin 26 that is inserted through a hole in one barrel support 25 and extends through an opening in wall mount 25 and through a hole in the opposite barrel support 25.

A clutch system 20 is attached to shaft 19 so that the clutch system 20 may slide along the length of shaft 19. A piston lever 35 is attached to clutch system 20 and extends away from of extruder mount 15. Piston lever 35 is attached to clutch system 20 at a pin 36, allowing a user to slide clutch system 20 along shaft 19 by applying force upward or downward on piston lever 35. A piston system 40 is attached to piston lever 35 near pin 36 so that it moves with piston lever 35 when force is applied by the user. As shown in FIG. 1, when clutch system 20 is in its lowest position along shaft 19, piston system 40 is fully within barrel 30. Barrel 30 is connected to wall mount 15 by barrel supports 25. In at least one embodiment, barrel 30 is shaped as a hollow cylindrical tube. A barrel opening 32 located at the top of barrel 30 allows access to the interior of barrel 30.

Figure 2:
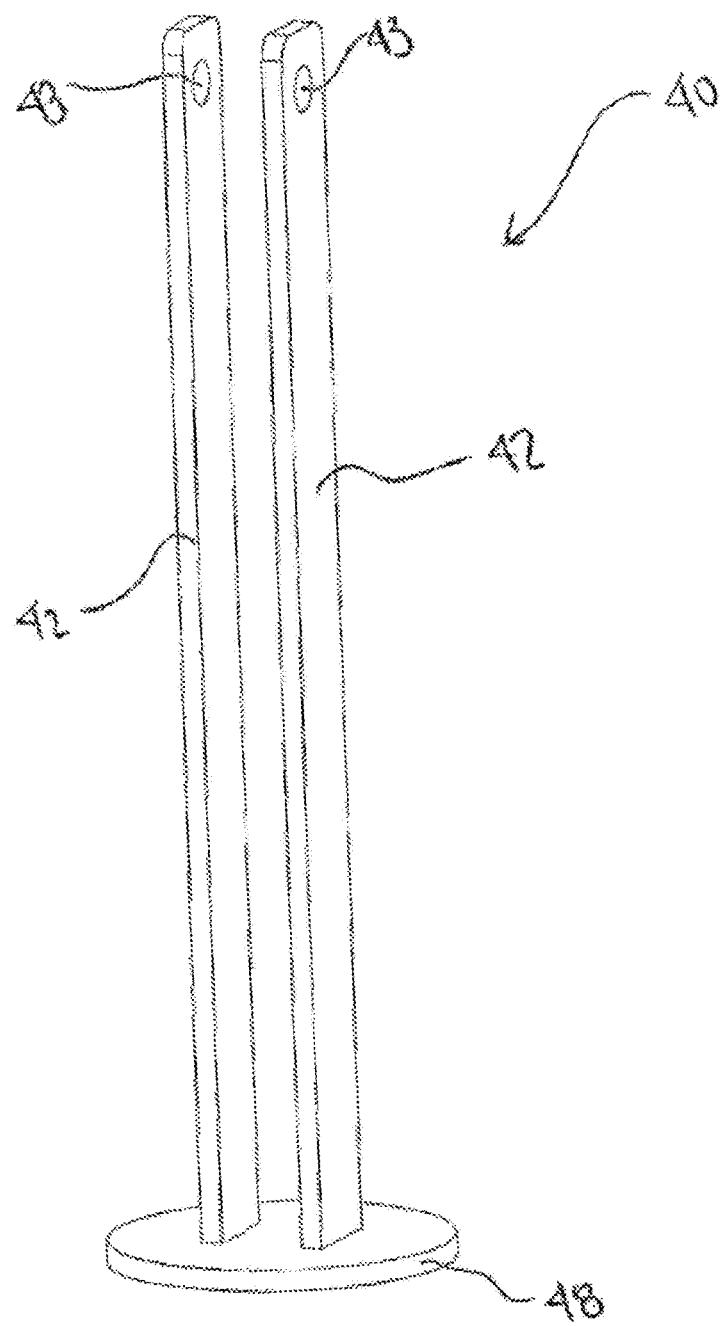
FIG. 2 is a perspective view of the piston assembly from the extrusion assembly of FIG. 1 according to exemplary embodiments of the present disclosure.

As seen in FIG. 2, piston system 40 may include a pair of piston arms 42. Arm openings 43 are positioned near the upper end of piston arms 42. Piston arms 42 may be attached to piston lever 35 using a pin 46. To attach arms 42 to lever 35, piston system 40 is positioned so that lever 35 is between pistons arms 43. Pin 46 may be disposed through one of the arm openings 43, through an opening in lever 35, and then through the second arm opening 43. A piston disk 48 may be attached to the bottom end of piston arms 42. Piston system 40 may be removed from barrel 30 by pulling upward on piston lever 35 and causing clutch system 20 to slide upward on shaft 19. If clutch system 20 is slid far enough on shaft 19, piston system 40 including the piston disk 48 may be removed from barrel 30, enabling access to barrel 30 through an upper barrel opening 32.

Figure 3:
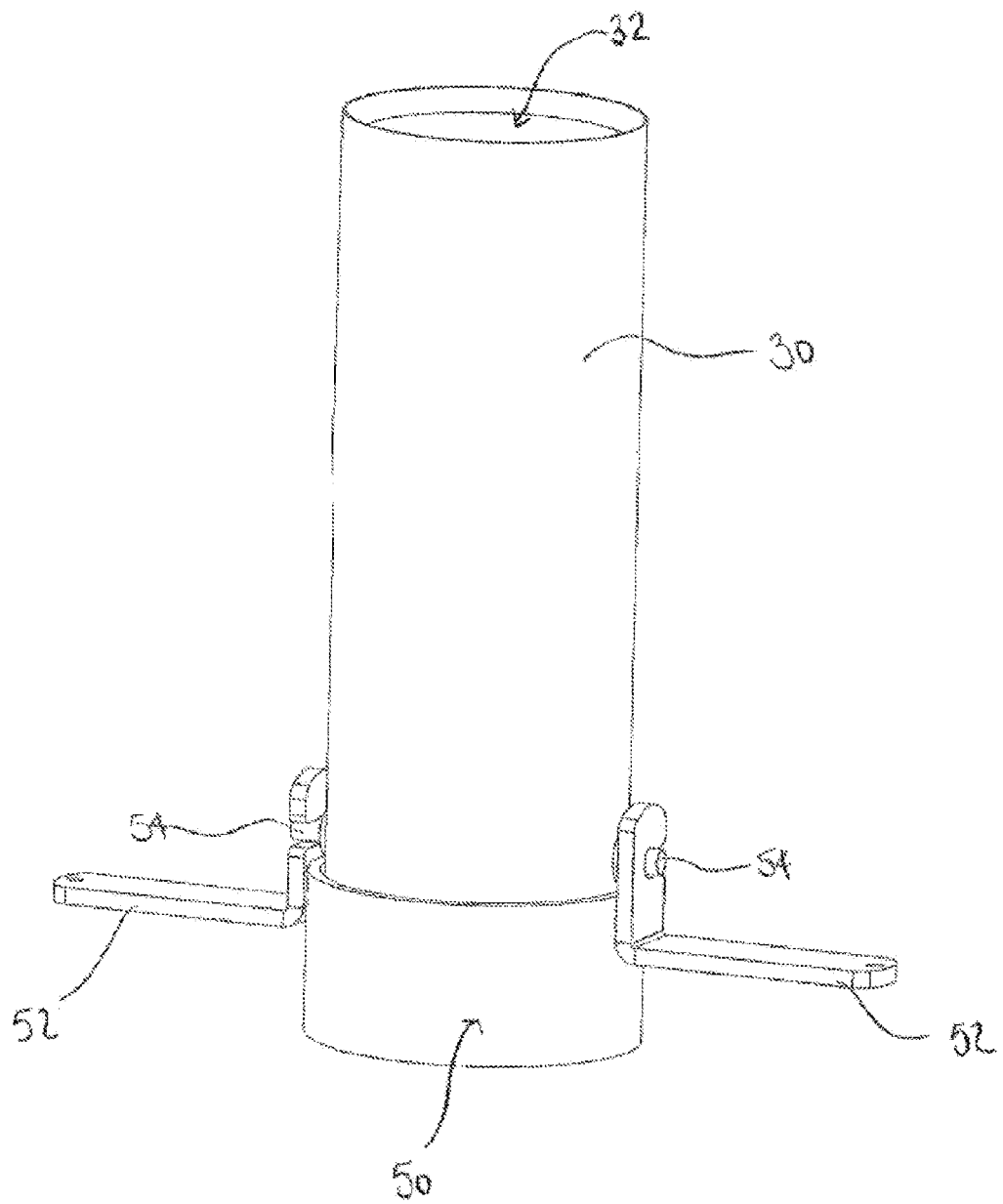
FIG. 3 is a perspective view of the barrel and base cap from the extrusion assembly of FIG. 1 according to exemplary embodiments of the present disclosure.
Figure 4:
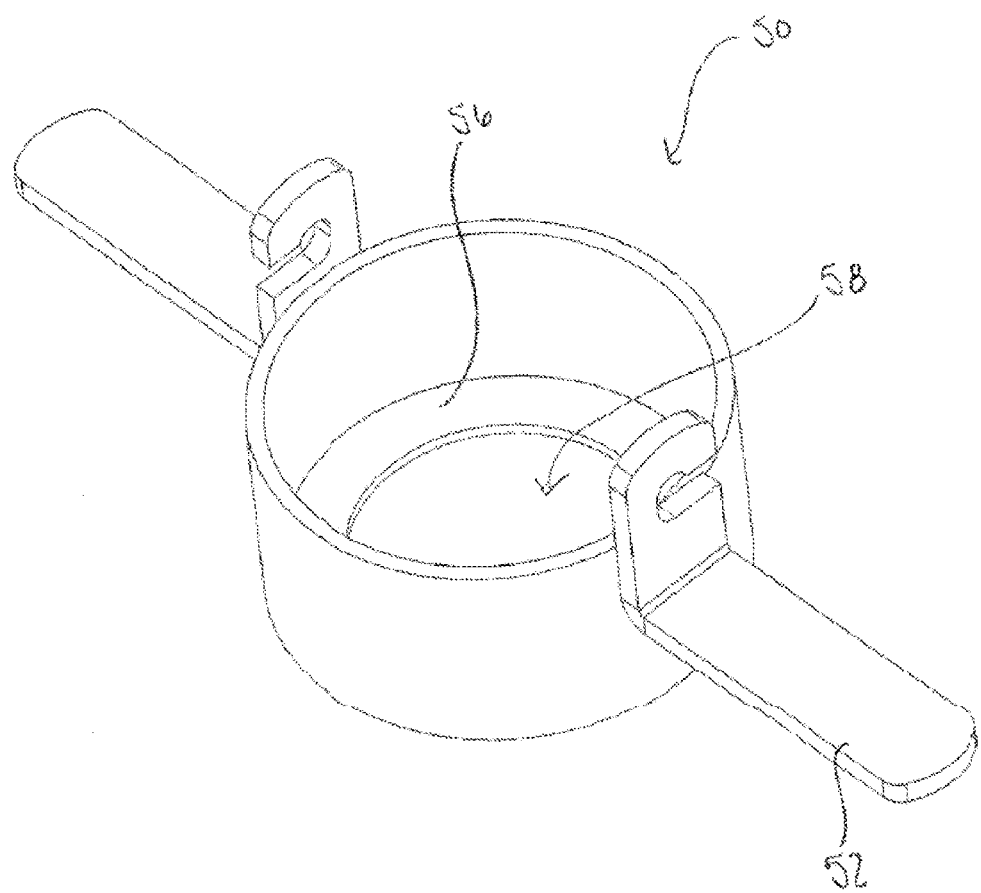
FIG. 4 is a perspective view of the base cap from the extrusion assembly of FIG. 1 according to exemplary embodiments of the present disclosure.

As shown in FIG. 3, a base cap 50 may be reversibly attached to the bottom of barrel 30. As shown in FIG. 4, the base cap 50 may include one or more base cap handles 52 positioned on opposing sides of base cap 50, which further includes notches configured to engage pins 54 located on barrel 30 (shown in FIG. 3), enabling easy installation and removal of base cap 50 from the bottom of barrel 30. An opening 58 in the bottom surface 56 of base cap 50 accepts a die (not shown) through which the extrudable material may be pushed by the piston system 40. The die maybe a conventional tool die and may include at least one opening of a desired shape, depending on the desired shape and size of the extrusion. For example, the die may have an opening in the shape of a triangle to create an extrusion with a triangular cross-section or in the shape of a square to create an extrusion with a square cross-section.

Figure 5:
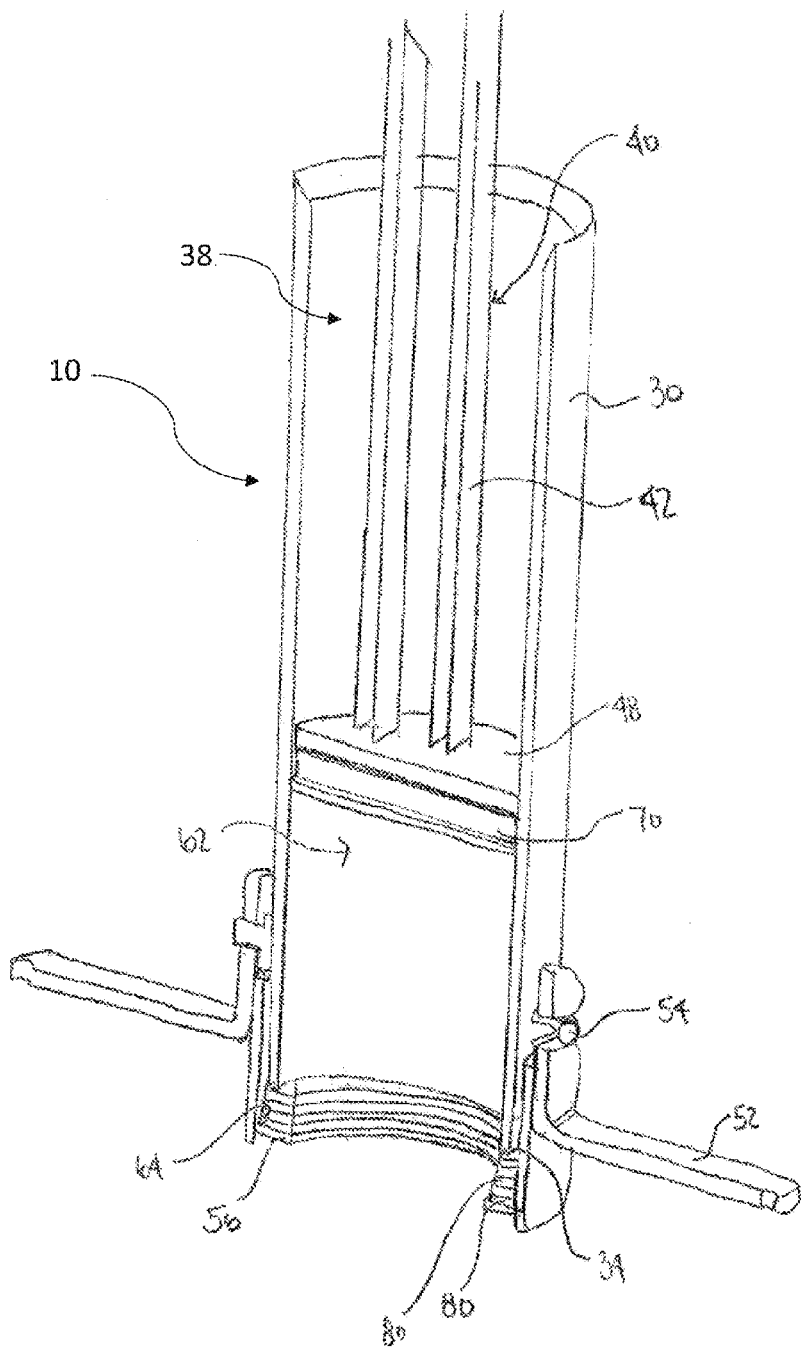
FIG. 5 is a cross-section view of the extrusion assembly from FIG. 1 according to exemplary embodiments of the present disclosure.

FIG. 5 illustrates a cross-section of extrusion assembly 10, including the piston system 40 inserted within barrel 30. As shown in FIG. 5, the barrel 30 includes an inner surface 38 defining a volume with the barrel 30. When piston system 40 is inserted into barrel 30, a variable volume 62 is created between inner surface 38, piston disk 48 and the bottom portion 56 of base cap 50. In operation, extrudable material, such as clay, is positioned in volume 62 and is pushed through base cap opening 58 as the material is forced downward by movement of piston system 40 caused by the user.

Figure 6:
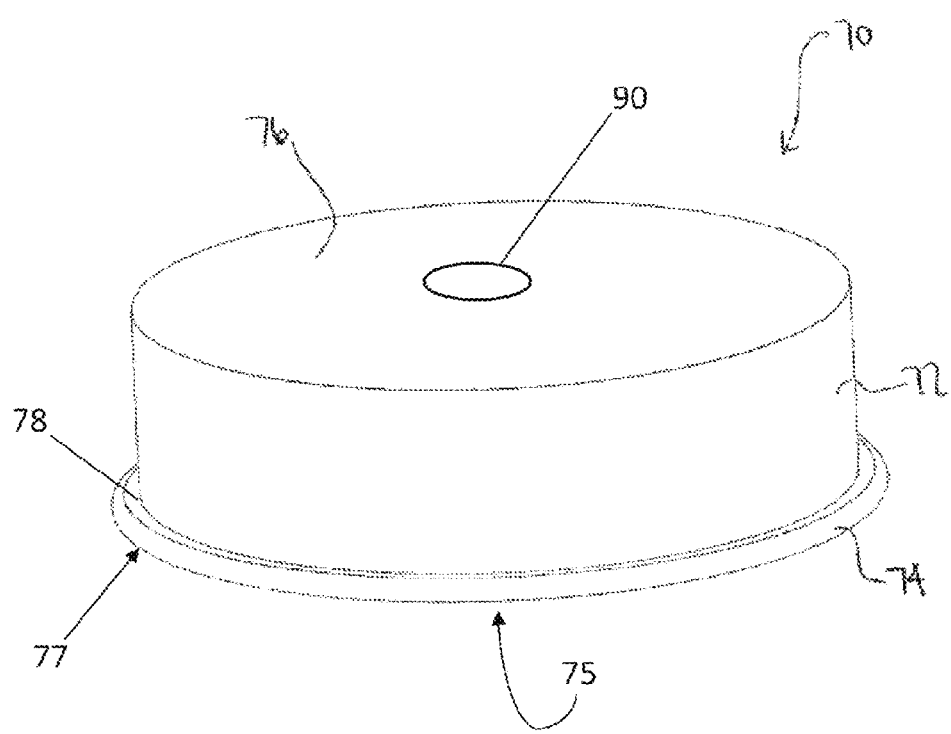
FIG. 6 is a perspective view of a barrel seal according to exemplary embodiments of the present disclosure.

In at least one embodiment according to the present disclosure, a barrel seal 70 is positioned between the extrusion material and the piston disk 48. In such an embodiment, barrel seal 70 is structured with a shape and size that is approximately equal to the internal shape and size of barrel 30. As one example, where the barrel 30 has a cylindrical shape with a circular cross-section, an embodiment of the barrel seal 70 may have a round, generally puck-shaped, profile with a diameter that is approximately equal to the inner diameter of barrel 30. In such an embodiment, as shown in FIG. 6, barrel seal 70 includes a body 72 having a top surface 76 and an axially opposing bottom surface 78. In operation, barrel seal 70 is inserted into barrel 30 so top surface 76 of barrel seal 70 contacts piston disk 48 and bottom surface 75 rests on the extrudable material residing in the volume 62. In alternative embodiments, the barrel 30 may have non-circular cross-section, and the barrel seal 70 has a complementary, non-circular, shape.

Barrel seal 70 further includes a lip 74 extending radially from the body 72 at or near the bottom surface 78. In at least one embodiment, the lip 74 may comprise a disk of larger diameter than the body 72 that is affixed to the bottom surface 78 of the body 72. The lip 74 includes a perimeter 77 having a size and shape structured to complement the inner surface 38. For example, where the barrel 30 has a cylindrical cross-section, an embodiment of the lip 74 may have diameter defined by the perimeter 77 approximately equal to or slightly smaller than the diameter of the barrel 30 defined by the inner surface 38. Lip 74 is structured to contact the inner surface 38 of barrel 30 to seal any gap that may exist or potentially develop between piston disk 48 and barrel 30. The lip 74 enables a consistent and predictable pressure and flow fluid to be created within volume 62 and the material contained therein during extrusion. The perimeter 77 of the lip 74 may include a radius to facilitate movement of the barrel seal 70 along the inner surface 38 when downward force is applied via the piston system 40. In at least one embodiment, the radius of the perimeter 77 may be about 0.063 inches (in.).

The body 72 of barrel seal 70 may be made of a semi-rigid or rigid (i.e., firm) material capable of efficiently transferring force from the piston system 40 to the extrudable material. In one embodiment, body 72 may have a diameter of around 3.8 in. and a height of about 0.875 in. In such an embodiment, the barrel seal may have an overall height, including the body 72 and the lip 74, of around 1.125 in. The lip 74 may be made from a resilient material extending radially from body 72 around its circumference. The lip 74 may further be made of a non-sticky material that does not readily stick to the extrudable material. In certain embodiments, the lip 74 and the bottom surface 75 of the body 72 may include a non-stick coating that does not readily stick to the extrudable material. In certain embodiments, the seal barrel 70 may be fabricated by co-molding the lip 74 onto the body 72 in an injection molding process.

The lip 74 may extend from the body 72 by a distance that is large enough to enable the lip 74 to flex as the barrel seal 70 is pushed along the barrel 30. The lip 74 may extend from the body 72 by a distance that is limited to prevent the lip 74 from flexing too much as the barrel seal 70 is pushed along the barrel 30 such that material may leak passed the lip 74. In certain embodiments, the lip 74 may extend between about 0.1 and 0.5 in. from the body 72. In at least one embodiment, the lip 74 may extend about 0.295 in. from the body 72. The barrel seal 70 may further include a filet 78 between the body 12 and the lip 74. The filet 78 enables the lip 74 is reversible distort and flex as described herein without causing the lip 74 to crack or fracture at the interface to the body 72. In at least one embodiment, the filet 78 may be about 0.063 in.

In one aspect, the barrel seal 70 improves the performance of a conventional extruder by preventing the extrudable material from sticking to the piston click 48 and to the inner surface 38 of the barrel 30. With a conventional extruder, as the user attempts to withdrawal the piston system 40 from the barrel 30 after extruding the desired amount of extrudable material, the piston disk 48 may become stuck to the extrudable material due to its generally tacky nature, which can make the piston system 40 very difficult to withdrawal. Moreover, material that has leaked passed the piston disk 48 may further restrict movement of the piston system 40.

In at least one embodiment according to the present disclosure as shown in FIG. 6, the barrel seal 70 may include a fastener 90 disposed on the top surface 76 of the body 72. The fastener 90 is structured to releasably attach to the piston disk 48. The fastener 90 enables the barrel seal 70 to maintain contact with the piston disk 48 of the piston system 40. In certain embodiments, the fastener 90 may maintain contact with the piston disk 48 to a desired force load and then break free, thereby releasing from the piston disk 48. Such a fastener 90 improves operation of a conventional extruder by enabling the piston system 40 to be more easily pushed into the barrel 30 as the slide clutch system 20 ratchets along shaft 19. The fastener 90 may be any suitable releasable fastener, for example a snap button. In at least one embodiment, the fastener 90 may be a magnet that magnetically attaches with limited force to the piston disk 48. In alternative embodiments, the fastener 90 may be a hook and loop fastener, such as is commonly known as Velcro®. In such embodiments, the piston disk 48 may include a mating fastener piece.

Referring to FIG. 5, in at least one embodiment according to the present disclosure, a bottom edge 34 of barrel 30 often does not extend to the bottom surface 56 of base cap 50, resulting in a bottom gap 64. The bottom gap 64 is often due to the frequent need for extruders to accommodate more advanced dies, such as those using a spider, to achieve more advanced extrusions, such as hollow shapes. Such an arrangement may cause the material being extruded to be forced into the bottom gap 64 between bottom edge 34 and bottom surface 56, causing an inconsistent extrusion. The extruded material may be prevented from entering bottom gap 64 by using one or more spacer rings 80 to fill bottom gap 64 and effectively extend the barrel 30 down to the die.

Figure 7A:
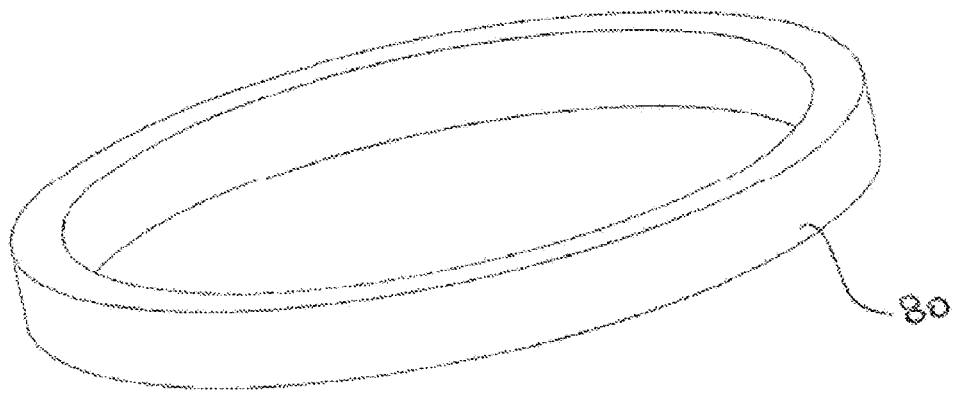
FIG. 7A is a perspective view of a ring seal according to exemplary embodiments of the present disclosure.
Figure 7B:
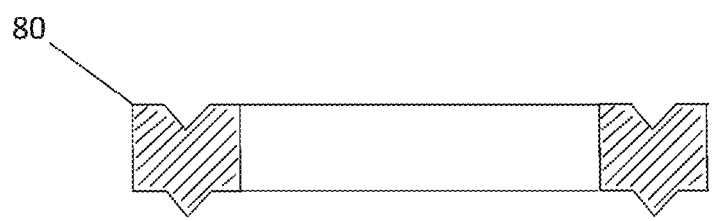
FIG. 7B is a cross-section view of a ring seal according to exemplary embodiments of the present disclosure.

As shown in FIG. 7A, spacer rings 80 are rings that may be made from a rigid or a resilient, compressible material. Spacer rings 80 may be configured to fit within the base cap 50. For example, spacer rings 80 may have the same or similar inner diameter as barrel 30 so as to fit between barrel 30 and bottom surface 56 of base cap 50. Spacer rings 80 may be held in place by the compressive force between barrel 30 and base cap 50. Multiple spacer rings 80 may be used to fill bottom gap 64 by sitting on top of one another to accommodate extruders having varying sized gaps. In certain embodiments, as shown in FIG. 7B, spacer rings 80 may have protrusions or grooves on their axial surfaces that enable multiple spacer rings 80 to be interlocked and securely stacked on each other so as not to slide relative to each other. In certain embodiments, the bottom-most spacer ring 80 adjacent the base cap 50 may include a flat side (i.e., without protrusions or grooves) adjacent the base cap 50 to facilitate sealing there-against.

Base cap 50 may be removed from barrel 30 and a different base cap 50 may be attached to provide a different size or shape extrusion. When a new base cap 50 is added, the number of spacer rings 80 may be increased or decreased to fill the gap between the bottom surface 56 of the base cap 50 and the bottom of barrel 30. In certain embodiments of the extruder assembly 10, there is no bottom gap 64 between the base cap 50 and the bottom edge 34 of barrel 30, and such an embodiment may not include any spacer rings 80.

In operation, the user selects the desired base cap 50 and die to be attached to the base of barrel 30. The combination of the opening 58 and the die in the bottom of base cap 50 determines the shape that the extruded material exiting the extruder assembly 10 once pushed through barrel 30. The user may stack spacer rings 80 on bottom surface 56 of base cap 50 to fill the bottom gap 64 created between the bottom edge 34 of barrel 30 and bottom surface 56. The number of spacer rings 80 that are stacked depends on the size of the bottom gap 64. The number of spacer rings 80 employed should entirely fill bottom gap 64 (see FIG. 5).

The piston system 40 may be initially removed from barrel 30 allowing the user access to volume 62 through upper barrel opening 32. The user inserts an extrudable material, such as clay or a food product or component (e.g., plant matter, muscle cells and/or fatty particles (e.g., lipid particles, adipose cells and/or tissue, etc.)), into the barrel 30 through upper barrel opening 32. Once the extrudable material has been placed in barrel 30, the user places the barrel seal 70 into barrel 30 such that barrel seal 70 rests on top (i.e., at the back) of the extrudable material. Barrel seal 70 is positioned so protruding edge 74 is located near the extrudable material.

Once spacer rings 80 and base cap 50 have been properly installed and the extrudable material and barrel seal 70 have been inserted into barrel 30, the user positions piston system 40 so piston disk 48 aligns with and contacts top surface 76 of barrel seal 70. The user then applies downward force on piston lever 35, causing piston system 40 to push downward on barrel seal 70 and slide through barrel 30. As piston system 40 and barrel seal 70 move through barrel 30, the extrudable material is forced through the die and extruded from opening 58 of base cap 50. While barrel seal 70 moves through barrel 30, lip 74 contacts the inner surface 38 of barrel 30 such that no gaps exist between seal 70 and barrel 30. If barrel seal 70 were not present, gaps could exist between piston disk 48 and the inner surface 38, causing some of the extrudable material to be pushed through these gaps (i.e., leak-back), which can affect the consistency of the extrusion.

The barrel seal 70, by preventing leak-back, also serves to make the extrusion process easier for the user. By preventing leak-back, the barrel seal 70 prevents material from being trapped above the piston disk 48 and between the piston disk 48 and the inner surface 38. In addition, the surface of the piston disk 48 does not contact the typically sticky surface of the extrudable material and thus can be moved up and down much more freely. In a conventional extrusion process, the piston disk 48 can become stuck, requiring great force to remove from the barrel 30.

The sealing rings 80 act to fill bottom gap 64 between the bottom edge 34 of barrel 30 and bottom surface 56 of base cap 50. Without sealing rings 80, extrudable material may be forced through bottom gap 64 and get lodged between base cap 50 and the outer surface of barrel 30. Bottom gap 64 may also affect the consistency of the extrusion, which may be undesirable for various products for which the extrusion is to be used. With sealing rings 80 in place, the extrudable material cannot enter bottom gap 64 and a more consistent extrusion is achieved.

Barrel seal 70 may also assist in cleaning extrusion assembly 10. To clean barrel 30, the user may remove the base cap 50 and any remaining extrudable material from barrel 30 and insert barrel seal 70 into barrel 30 through opening 32. Piston disk 48 is then positioned on top surface 76 of barrel seal 70, and the user pushes downward on piston lever 35 to force piston disk 48 and barrel seal 70 through barrel 30. As barrel seal 70 moves through barrel 30, lip 74 scrapes excess material from the inner surface 38 of barrel 30. Thereafter, the piston disk 48 can be easily withdrawn back through the barrel 30 (using the piston lever 35 or otherwise) because it is not in direct contact with the extrudable material; instead, the piston disk 48 releases from the barrel seal 70 and is easily pulled back up through the barrel 30 toward the barrel opening 32, whereas the barrel seal 70 remains coupled with the extrudable material and may be removed through the bottom edge 34 of the barrel 30.

The barrel seal 70 may further increase the reliability and longevity of the extrusion assembly 10. In a conventional extruder, the piston disk 48 can become bent due to the repeated force applied against an uneven extrudable material of variable hardness. The barrel seal 70 enables the piston disk 48 to consistently seat against a firm surface and uniformly distributes pressure from the piston disk 48 to the extrudable material, thereby prevent excessive unbalanced forces that can wear and damage the piston disk 48.

Now referring to FIGS. 9A-12B, the uniform distribution of pressure across the barrel seal 70 is also important in operation as it facilitates the creation of a vortex within the interior of the barrel 30 when force is applied to the first end of the body 72 of the barrel seal 70. The effect of such vortex can be visualized on the extrudable material in FIGS. 12A and 12B, which provide visual examples of the forces applied to the material being extruded through the assembly of the present disclosure in operation by virtue of the inventive designs presented herein.

Figure 9A:
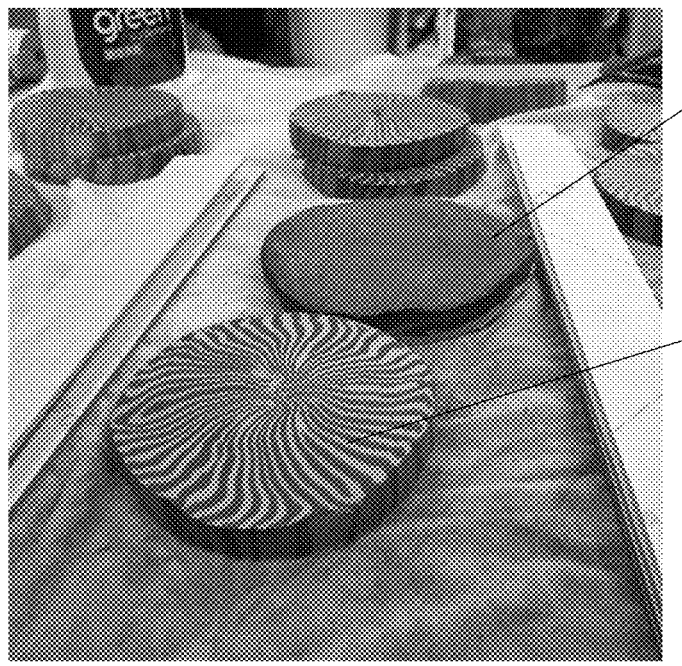
FIG. 9A shows a photograph of separated layers of an initial roll, pre-stack, with one of the layers comprising a horizontal stack of two colors and at least one of the layers comprising a radial stack of two colors.
Figure 9B:
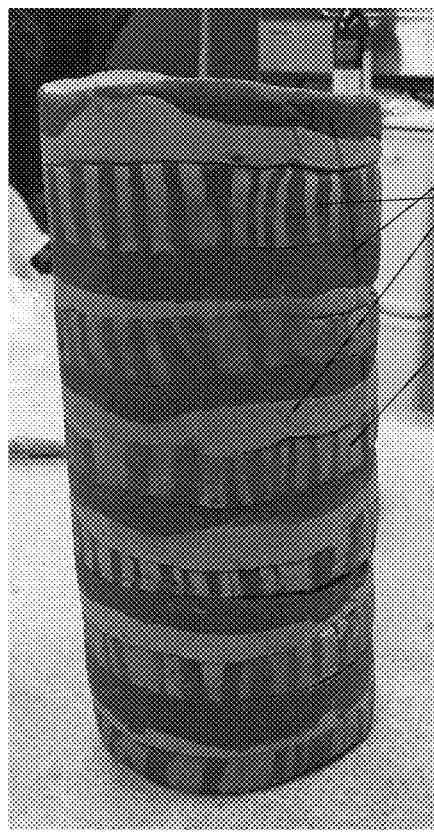
FIG. 9B shows a side view of at least one embodiment of an initial roll pattern pursuant to the present disclosure.
Figure 9C:
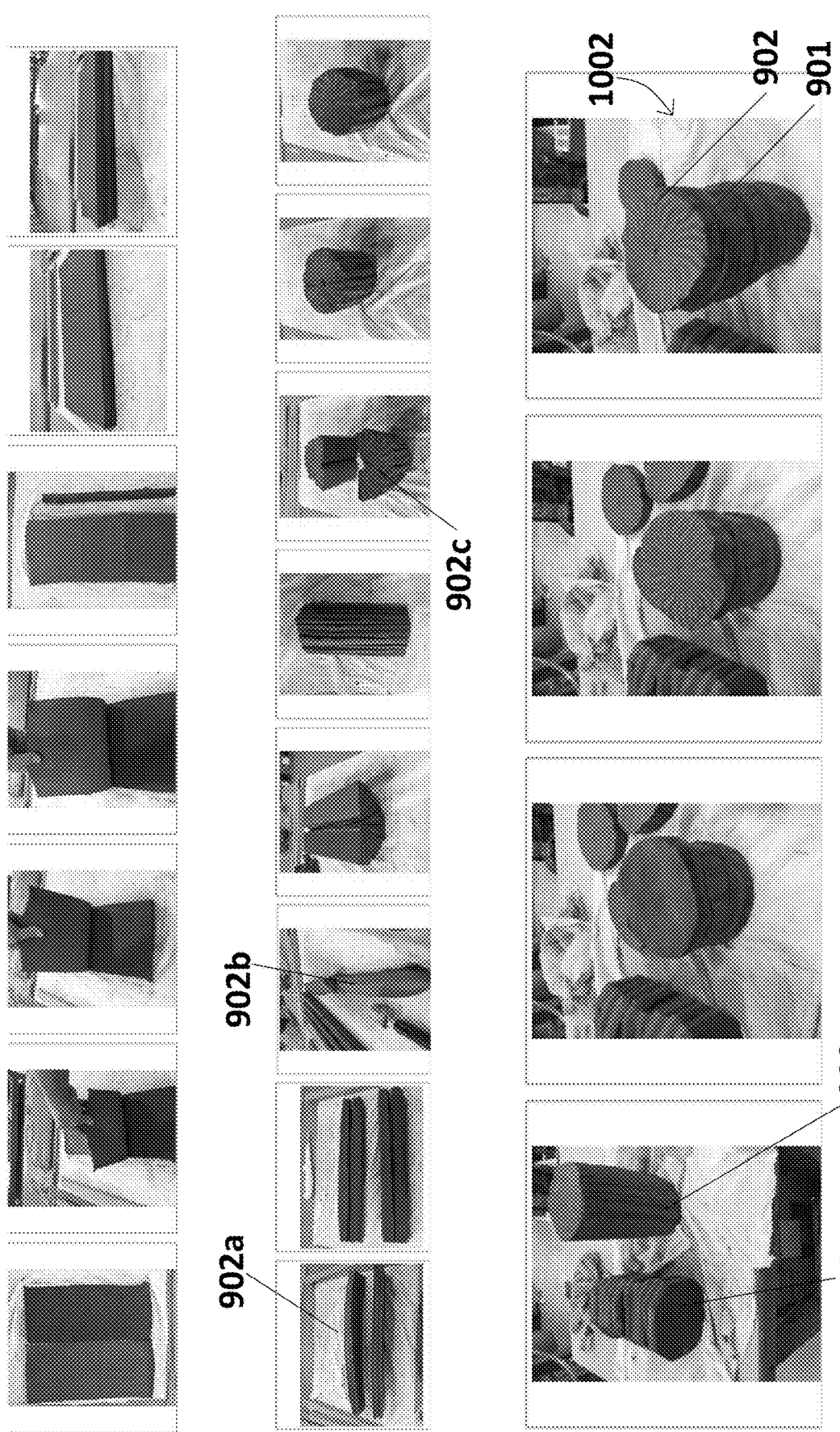
FIG. 9C shows a step-by-step diagram of the steps of preparation at least one embodiment of an initial roll for millefiori pattern extrusions.
Figure 10:
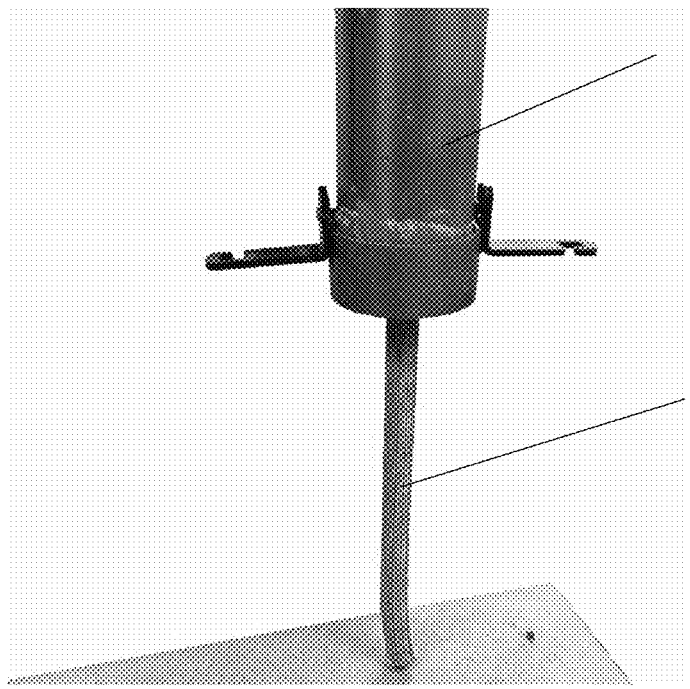
FIG. 10 shows a photograph of extruded material hanging out of a die of the assembly of the present disclosure prior to cutting.
Figure 12A:
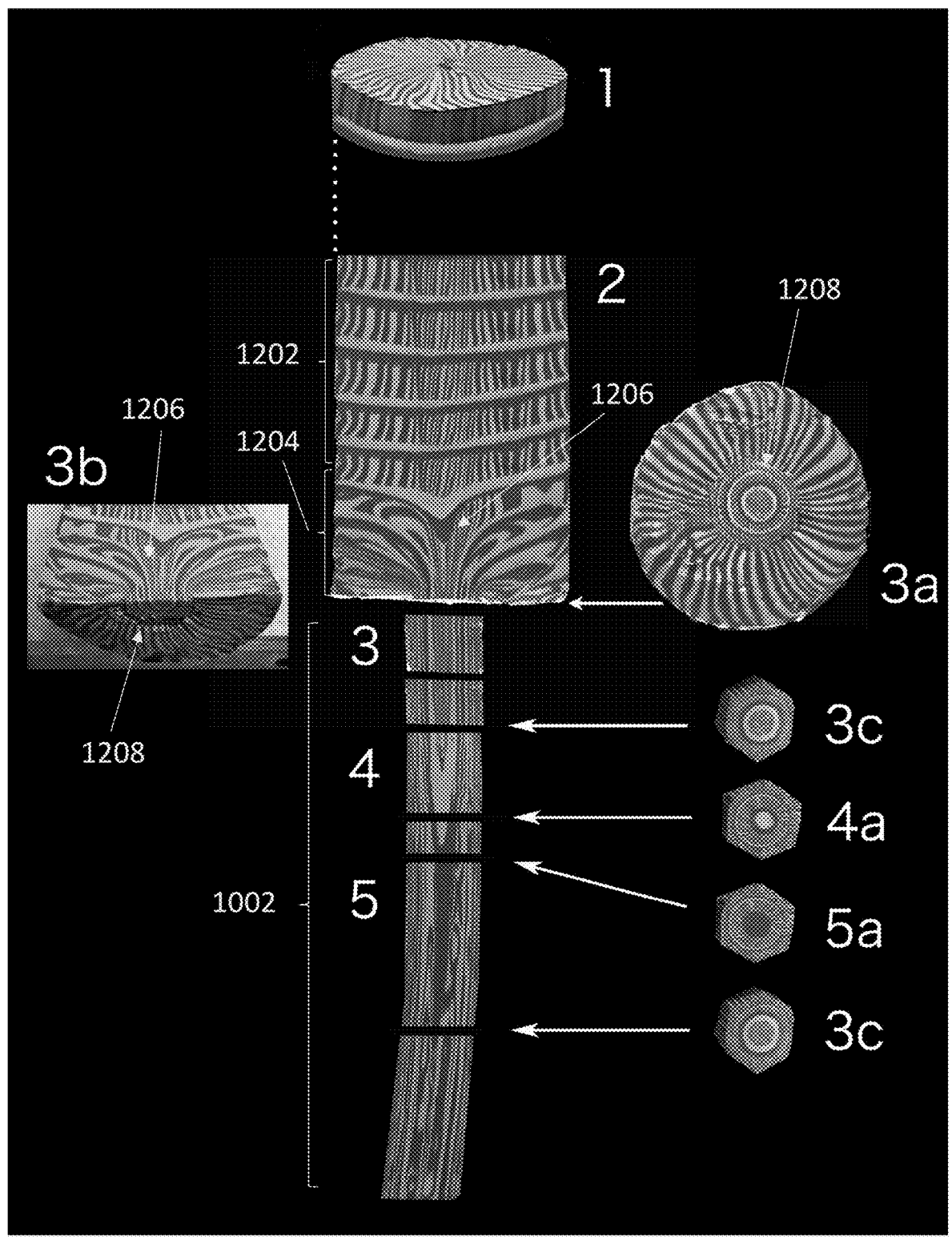
FIG. 12A shows a photograph diagram of extrudable material at various stages of extrusion using the systems and methods of the present disclosure, with portion 1 showing a perspective view of initial extrudable material prior to insertion into the extrusion barrel, portions 2, 3, 3b, 4, and 5 showing vertical cross sectional views of the extrudable material, and portions 3a, 3c, 4a, and 5a showing horizontal cross sectional views of the extrudable material.

More specifically, FIGS. 9A-9C show the initial material 900 and options for forming the same, FIG. 10 shows the extruded material 1002 after exiting the assembly, and FIG. 12A shows a photographic diagram of extrudable material as it is loaded into (portion 1), pushed through (portion 2), and exits (portions 3-5) the inventive extrusion assembly comprising the barrel seal 70 of the present disclosure.

Portion 1 of FIG. 12A displays a perspective view of an initial material 900 comprising extrudable material that is formed for loading into the barrel opening 32. As shown in detail in FIGS. 9A-9C and 12A, in at least one iteration of the present disclosure, the initial material 900 comprises at least one first stack layer 901 having both white and black clay arranged in a radial stack, and at least one second stack layer 902 having both white and black clay arranged in a horizontal stack. These stack layers 901, 902 may then be repeated in the initial material 900 as shown in FIG. 9B. Notably, the individual, handmade rods 800 of conventional techniques are not required (nor are the multiple rolling, compressing, and cutting steps); instead, the initial material 900 is much quicker and easier to prepare. In the embodiment shown in FIG. 9A, the initial material comprises simply layers stacked together, all having a diameter of about 103 mm (however, it will be noted that any diameter suitable to fill the barrel 30 of the system may be employed).

In the context of food production, where these layers comprise one or more cell sheets (e.g., comprising muscle cells, fatty particles, adipose cells or a sheet of fascia), the layers can be arranged and have suitable diameters to affect an extruded meat or clean-meat product having the desired fat to meat ratio and/or with the various types of fibers/cells in the desired locations. For example, where the extruded food product is to resemble a steak, the layers and materials comprising the muscle and adipose tissue can be elected to affect the desired marbling to mimic a specific cut of meat and/or type of meat. Additionally, one or more layers can comprise functional nutrients that are not found in natural meat, which may also be incorporated either in one or more nutrient-specific (dedicated) layers or in a layer that is a mixture of the functional nutrients and other cells/tissues.

While the initial material 900 shown here comprises a repeating stack comprising two types of extrudable clays, food matter (e.g., plant matter), or animal components (e.g., muscle cells, skeletal cells, fatty particles (e.g., lipid particles, adipose cells or the like), etc.) each having different colors and arrangements and all formed into a roll, it will be appreciated that any number of different materials may be employed to form the initial material 900 (e.g., at portion 1). The initial material 900 may also have any number of stacked layers. In at least one embodiment, for example, the initial material 900 may comprise two or more different extrudable clays, two or more different meat components (whether natural or cultured), and/or other materials, with each material present in each of the twelve layers. Additionally or alternatively, the initial material 900 may comprise three or more different types of extrudable clay, food matter (e.g., plant matter), animal components (e.g., muscle cells, skeletal cells, fatty particles (e.g., lipid particles, adipose cells, adipose tissue, or the like), etc.) and/or other materials, with one or more of the layers comprising a single material throughout that layer. In yet other embodiments, the initial material 900 may comprise between three and ten different materials, or ten or more materials, with each of the different layers having one or more materials arranged and/or stacked in varying patterns.

Indeed, various materials may be employed in a variety of combinations as desired including, without limitation, translucent clay (i.e. a clay that fires translucent), ceramic clay, high fire clay, low fire clay, metal clay, circuit clay, and/or any combination of the foregoing. In at least one exemplary embodiment, the materials comprise one or more types of water-based clay. Where the devices, systems and methods hereof are used to produce a meat or clean-meat product, a variety of combinations of meat components can be used, for example, and without limitation, cell sheets, muscle cells and/or tissue, skeletal cells and/or tissue, blood vessels, fatty particles (e.g., lipid particles, adipose cells and/or tissue, etc.), and/or any combination of the foregoing. Further, one or more layers can comprise fascia or any other type of tissue that may be desired in a cut of meat or meat product and/or functional nutrients (e.g., vitamins, minerals, healthy fats, fiber, etc.) that may not be found in natural meat. In certain embodiments, functional nutrients can be mixed with the adipose tissue/cells which, in some cases, can provide a preservatory effect on the functional nutrients. In this manner the resulting extruded food product can be designed to comprise a specific nutritional and/or flavor profile as needed or desired. In certain embodiments, the extruded food product can be formed out of specific ingredients at specific ratios to align with a subject's dietary and/or health needs (e.g., a mammal, a patient, a pet, or a human individual).

Furthermore, any number of layers may be utilized as desired (with more layers, typically resulting in more yield of extruded end product and an increase in thickness of a layer resulting in an increased production of the respective pattern in the extruded material). In certain embodiments, for example, where a leaner cut of meat is desired, the layer(s) comprising muscle tissue can be thicker than a layer(s) consisting mostly of adipose tissue and/or the ratio of muscle tissue to fatty particles can be adjusted to align with a lean cut of meat (e.g., 90/10 ratio). The thickness of each layer can also be adjusted to affect resulting mouthfeel/texture of the extruded food end-product.

The initial arrangement of the various materials may also be manipulated to achieve a desired effect or pattern (complex or otherwise) in the resulting extrusion. The arrangement at portion 1 in FIG. 12A and in layers 901, 902 of FIG. 9A result in a millefiori pattern on the extruded material 1002 as is discussed in more detail below. However, one of skill in the art will appreciate that the patterns, materials, and/or stack organization may be manipulated to result in different stresses within the resulting extruded material, which can have a significant effect on the resulting shape of the extruded material once fired. Additionally, the materials may be selected with the end product type in mind; for example, and without limitation, where an acoustic tile for sound and/or speaker applications is desired, the at least one of the material(s) may be selected for vitrification such that the fired end product will muffle and/or bounce sound waves. Similarly, as noted above, where a leaner or fatter cut of meat is desired, a user can adjust the ratio of muscle tissue to adipose tissue used in the layers, the thickness of the various layers, and the positioning of the different components within the stack organization.

Additionally or alternatively, one or more porous materials may be incorporated into the initial roll where it is desirable for the extruded product to have bacterial absorbent, odor absorbent, or other absorbent properties. There, for example, the absorbent material can be incorporated into the stacks of the initial material 900 in such a manner that an outer layer of each resulting extruded product (e.g., a tile or the like) includes a liquid or odor pervious portion which allows liquid, bacteria, and/or odor to enter the tile, but prevents the absorbed material from migrating between adjacent tiles.

Still further, one or more of the materials may comprise a translucent clay or other material that results in a translucent end product. Such materials may be especially useful where a tile or other end product that allows light to pass therethrough is desired. For example, where a translucent material is incorporated into the stack pattern of the initial roll, the end product may comprise at least a portion of translucent material. Notably, with many translucent clays and other materials, the amount of light allowed to pass therethrough is precisely tunable using techniques known in the art. Accordingly, the systems and methods of the present disclosure that enable the inclusion of highly detailed and precise images on the end product may be used, in at least one embodiment, to produce tiles where at least a portion of the extruded product/tile design is translucent. When laid over a light source, such tiles are particularly useful in architecture, interior, and artistic design applications as they are not only aesthetically appealing but also functional (e.g., by providing visibility to a user up a staircase or other pathway that is visually navigated).

FIG. 9C shows a step-by-step process of the preparation of initial material 900 according to at least one embodiment of the present disclosure. This particular repeated stacking design results in a millefiori-like end product that heretofore has been only achieved using manual or by-hand techniques. Pre-layers 902a, 902b, and 902c illustrate at least one process for preparing the arrangement of a starburst stacking layer 902 (here, the starburst stacking layer 902 comprised about 20 mm). In the at least one embodiment shown in FIG. 9C, layer 901 actually comprises two layers-one comprising a first color (here, white) which was about 8 mm thick, and a second comprising a second color (here, black), which was also about 8 mm thick. To achieve a millefiori-like design, layer 901 need only have a layer comprising a single color. While 901 may comprise multiple single-color layers stacked as shown in FIGS. 9A and 9B, it is preferable that there is at least one layer having a single color throughout. Furthermore, it will be noted that the design of layer 902 may comprise any design. While a starburst pattern is shown in FIGS. 9A-9C in layer 902, layer 902 may comprise a "hotdog" pattern (similar to that of rod 800 in FIGS. 8A and 8B), a striped pattern (similar to that of layer 806 in FIG. 8E), or even a previously extruded pattern.

Referring back to FIG. 12A, portion 2 is the initial material 900 that is positioned within the volume 62 of the barrel 30, where the barrel seal 70 (not shown) is positioned at least partially within the barrel 30 (not shown) and above the extrusion material/initial material 900, and downward force is applied to the barrel seal 70 and extrusion material via the piston system 40. Notably, the barrel seal 70 comprising lip 74 enables consistent and predictable pressure and flow within the volume 62 of the extrudable material (see section 1202 where the stackable layers are substantially maintained and no extrudable material oozing behind the barrel seal 70). However, at or near the bottom edge 34 of the barrel 30, the base cap 50, a vortex is formed by virtue of the opening 58 and die in the bottom of the base cap 50 that the extrudable material is pushed through. As seen in section 1204 of FIG. 12A, this vortex causes a core region 1206 of the extrudable material in section 1204 to flow faster than a lateral portion of the extrudable material (i.e. that portion closer to the inner surface 38 of the barrel 30) adjacent thereto as the extrudable material is forced through the die. This vortex in combination with the consistent downward force and no-leak design of the barrel seal 70 and lip 74, together with the elimination of any bottom gap 62 via the sealing rings 80, allows for a consistent exit of extrudable material through the die in a very unique, intricate, clear, and consistent pattern of materials. After exiting the assembly through the die, the extruded material 1002 comprises a repeating millefiori-like or other detailed patterns within its horizontal cross-sections. Notably, these patterns are all distinct and clear which is entirely unlike any other design or clay arrangement that is conventionally achievable using conventional extruders.

Figure 12B:
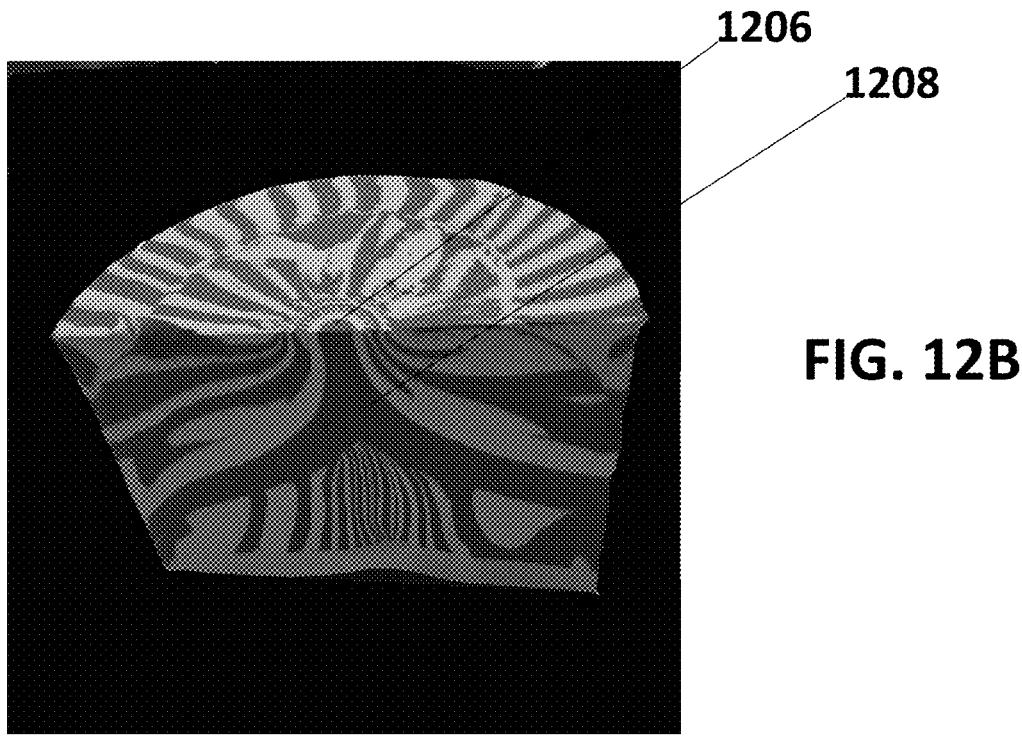
FIG. 12B shows a distal view of a cross-section of extrudable material removed from the barrel of an assembly of the present disclosure.

Portion 3a shows a cross-sectional view taken horizontally of extrudable material at a location just prior to moving through the die of the assembly, with portion 1208 clearly showing the unique design achieved by virtue of the vortex and other factors described above. Portion 3b shows an alternative double-cross-sectional view (taken both horizontally and vertically) to further illustrate the unique combination of forces achieved through this inventive system. Portion 3 was vertically cross-sectioned just after the extruded material 1002 was extruded through the die and was immediately adjacent to where the cross sections of portions 3a and 3b were taken. FIG. 12B additionally shows such a cross section of extrudable material taken at the same location, where the initial material 900 of the extrudable material was prepared using a different pattern. For the avoidance of doubt, the initial material 900/extrudable material in section 1202 does not have the intricate pattern displayed at portion 1208 (see section 1202); instead, it remains substantially identical to its initial design until the vortex pressure is combined with the consistent downward force applied by the firm surface of the barrel seal 70 against the bottom surface 56 of the base cap 50.

Figure 11:
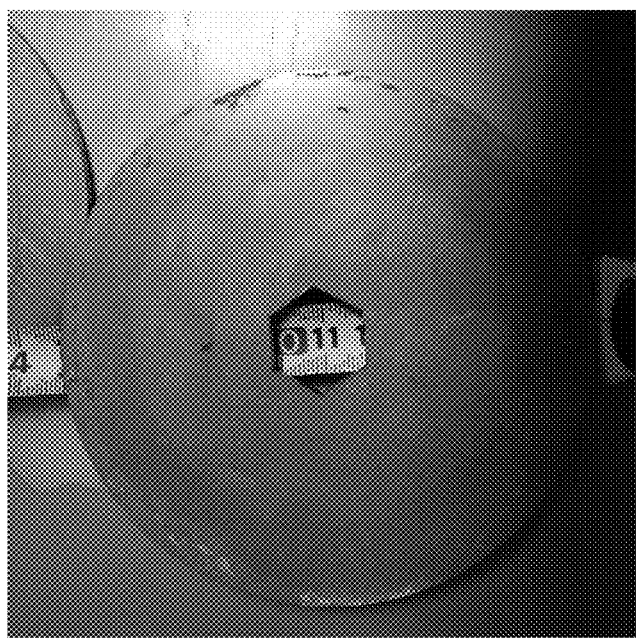
FIG. 11 shows at least one embodiment of a die for use in the assembly of the present disclosure.

Interestingly, the height of the vortex effect (i.e. section 1204), and thus the size of the resultant imaging/patterning on the extruded material, can be modified by adjusting the size of the die opening. Where a larger die opening is employed, the height of section 1204 increases relative to section 1202, whereas if a smaller die opening is used, section 1204 decreases in size and a smaller, more intricate image can be achieved in the extruded material. FIG. 11 shows at least one embodiment of such a die, where the die comprises a hexagon having about a 2 inch diameter. It will be appreciated that any other die shape and/or configuration may be employed as desired, for example, a hexagon comprising between about a 0.5 inch diameter and a 6 inch diameter (straight-side to straight-side), including without limitation a 20 mm diameter, a 22 mm diameter, a 24 mm diameter, a 1 inch diameter, a 27 mm diameter, a 1.5 inch diameter, a 2.5 in diameter, a 3 inch diameter, and the like. Additionally, where clay is utilized, a user can affect the resulting pattern by manipulating the memory of the clay. For example, the directional placement of the various layers in the initial material 900 can affect the movement of the clay within the vortex and in the resulting fired product.

Figure 13A:
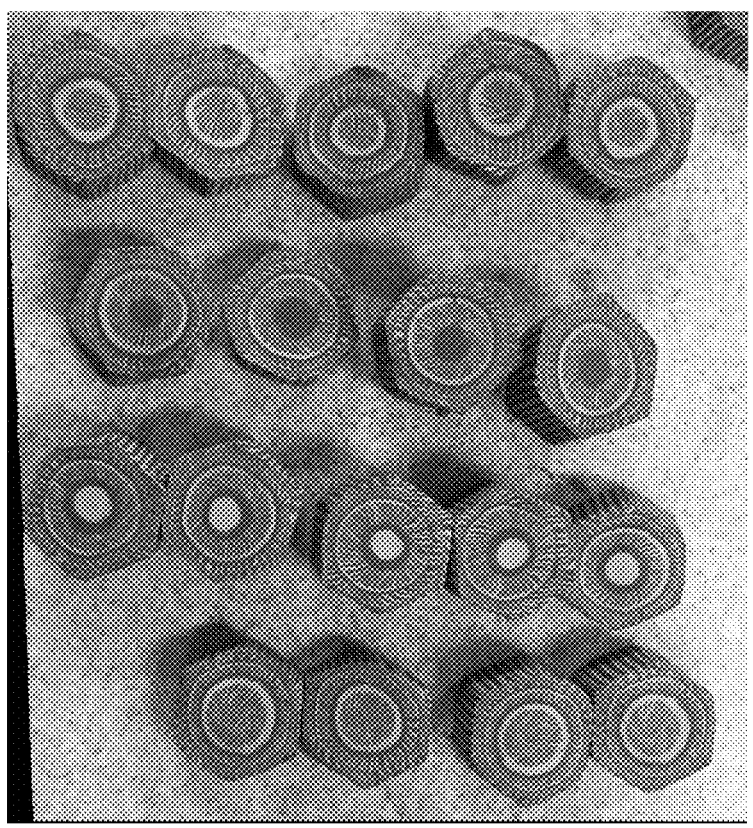
FIG. 13A shows cross-sections of material extruded resulting from initial material being extruded through an extruder system of the present disclosure, the extruded material cut into slices of about 7 mm thickness and arranged in groups of like patterns.
Figure 13B:
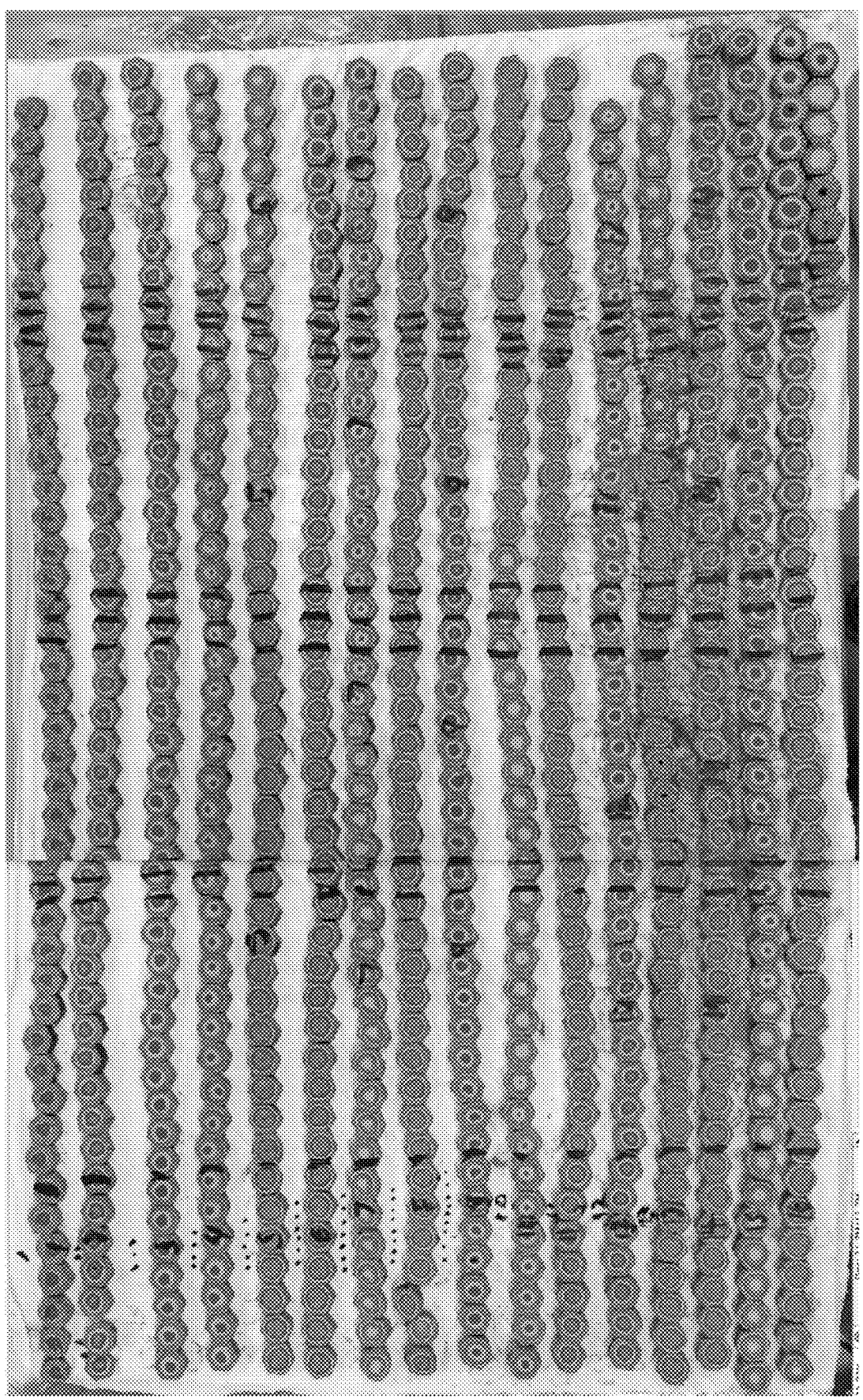
FIG. 13B shows cross-sections of material extruded through at least one embodiment of an extruder system of the present disclosure comprising a 103 mm barrel and a 20 mm die, each cross section cut at about 7 mm thickness, which illustrates the repeating patterns therein.

Referring now to horizontal cross-sections 3c, 4a, and 5a taken from portions 3, 4, and 5, respectively, the intricate pattern of the clay/materials can be seen in the resulting extruded material 1002. The progression between the patterns can be repetitive and consistent where the initial material 900 is arranged in a consistent pattern (see, e.g., the repetition of design in cross sections 3c, which resulted from the initial material's 900 repeated stack design shown in FIG. 9B). While only cross section 3c is shown repeated in the extruded material 1002 of FIG. 12A, where there is additional length of the extruded material 1002, the pattern of cross sections 4*a* and 5*a* will also repeat in the order displayed, consistently and at equal intervals, due to the pressure of the vortex created within the barrel 30. FIGS. 13A and 13B show about 7 mm thick, horizontal cross-sectional slices of material extruded using the methods and systems of the present disclosure (including a 20 mm die) and clearly illustrate the repetition of a starburst center, black center, white center pattern (FIG. 13A) and a starburst center, black center pattern (FIG. 13B) which is achieved by virtue of the vortex.

The patterns, and occurrence thereof, repeat depending on how the initial material 900 (i.e. the various materials are organized and/or stacked within the initial material 900). For example, the initial material 900 comprises a starburst 902, white (901), black (901) repeated pattern (see FIG. 9B). There, if the starburst layer 902 is thicker than the white and black layers 901, then the starburst center pattern will be the most predominant cross section in the extruded material (although, note that this may vary depending on the viscosity, colors, and/or compression characteristics of the various materials used). In the embodiments shown in FIGS. 13A and 13B, the starburst layer 902 was thicker than layer 901 in the initial material 900 and, thus, the resulting extruded material 1002 yielded 389 slices with a starburst center and 168 slices with a black center.

Figure 14:
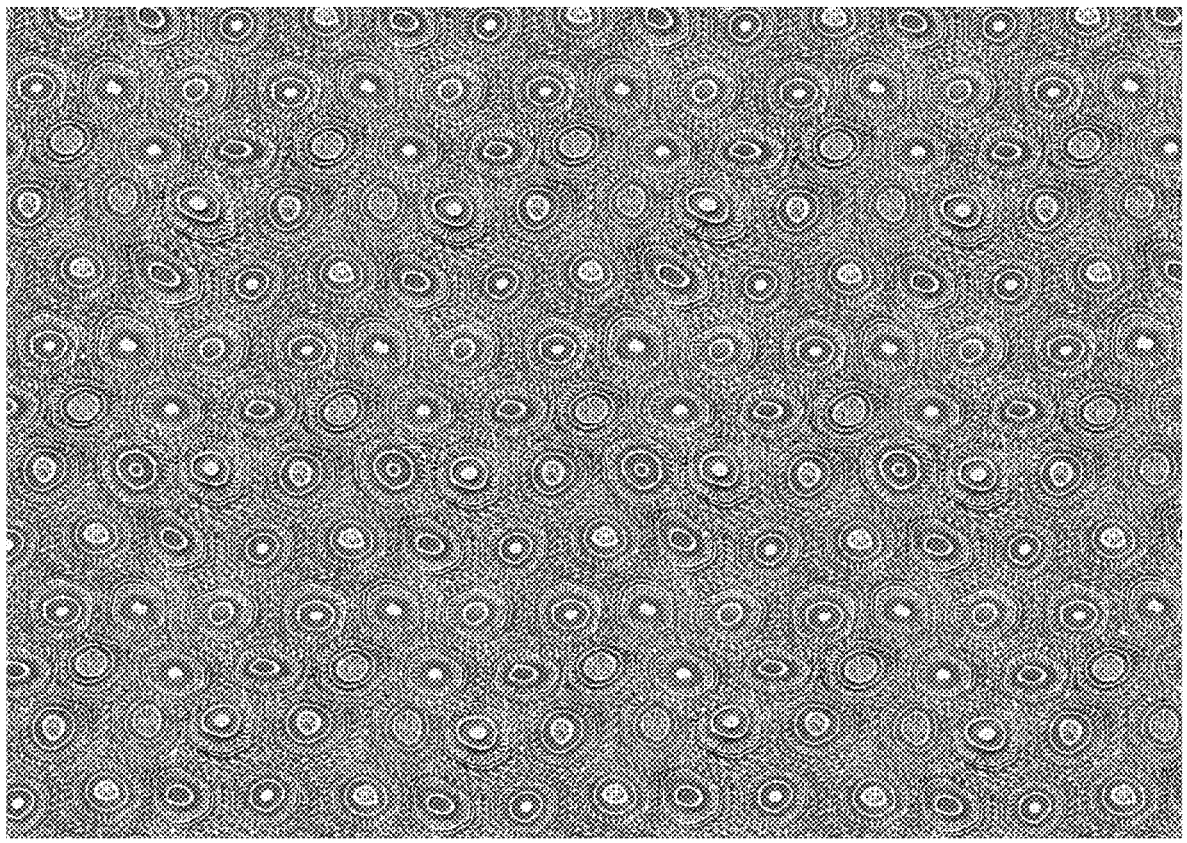
FIG. 14 shows a plurality of sliced cross-sections taken from material extruded pursuant to the methods, and using the assembly, of the present disclosure.

Thereafter, the extruded material 1002 may be sliced and the slices arranged and/or further processed as desired. For example, in at least one embodiment, the slices may comprise between about a 0.1 mm-3 cm thickness. One or more of the slices may be applied to and/or manufactured into a tile. Additionally or alternatively, one or more slices may be applied to any other type of apparatus where the millefiori-like design is desired for functional and/or aesthetic purposes. In at least one embodiment, a plurality of the slices may be arranged adjacent to and/or overlapping each other to create a sheet (see, e.g., FIG. 14). Such sheet may be further processed into pottery or other ceramics using methods commonly known in the art and/or overlaid over a mold or base material (e.g., a tile).

Still further, it may be desirable to deair and/or compress the resulting one or more slices. Such deairing and/or compression may be achieved using methods commonly known in the art including, without limitation, the application of pressure using a rolling pin or processing the slices and/or pre-cut extruded material 1002 in a deairing chamber coupled with a deairing apparatus such as a de-airing pug mill or other de-airing machine. Thereafter, the resulting produce can be finished (via firing or otherwise), applied to a mold, molded itself, or applied to a solid base material (e.g., a clay tile) or to the surface of a machine.

There are numerous commercial applications of the present technology. Primarily, millefiori-like designs can be easily and consistently produced using the extrusion systems hereof, thus providing a quicker and cost-effective mechanism to achieve such patterns and designs. For example, in at least one embodiment, an initial material comprising two or more clay types may be extruded from the die of the system to result in an extruded material comprising millefiori designs along its horizontal cross-sections. There, the extrusion material may be cut horizontally in between about 2 mm-10 mm horizontal cross sections and the resulting slices affixed to a bowl or other pottery for decorative purposes.

As previously noted, the present systems and methods may alternatively be employed to produce ceramic tile for acoustic applications. It will be appreciated by one of skill in the art that the intricate designs produced using the inventive extrusion system can be leveraged to include various sizes and/or textures out of either sound absorbing or sound refracting materials to achieve. Accordingly, the resulting extruded material may be cut into the desired shape before filing pursuant to methods known in the art. Additionally or alternatively, the systems and methods hereof can be utilized to produce ceramic materials/tiles that comprise translucent materials for architectural, design, safety and/or other purposes.

Still further, a plurality of extruders of the present disclosure may be utilized as a group to produce and cut tiles en masse. In at least one embodiment of such a system, the piston system 40 utilizes compressed air rather than hand powered piston levers 35. Additionally or alternatively, the material extruded from the plurality of extruders may be extruded into a tube using a de-aired vacuum and cut for tile or as a façade to cover the surface of tiles (or other materials) to incorporate a handmade look to the end product (albeit machine produced). Still further, such systems may be coupled with a coordinated deairing chamber such that a plurality extruded canes (each being extruded from one of the extruders in the system) are inserted into a common deairing chamber such that they are compressed together and deaired in a single, unified block.

As noted above, the devices, systems, and methods of the present disclosure can be used to produce a food product or component (e.g., a plant-based product, a clean-meat fiber, a meat product, and/or a clean-meat product). In recent years, scientists have begun to leverage the knowledge and tools accumulated in the fields of stem cells and tissue engineering toward the development of CBM products. In tissue engineering in particular, the physical and biochemical features of the native tissue can be mimicked; cells and biomaterials can be integrated under suitable culture conditions to form mature tissues. More specifically, in skeletal muscle tissue engineering, a plurality of cell types can be co-cultured on a three-dimensional (3D) scaffold to generate muscle fibers, blood vessels, and a dense extracellular matrix. Or, with respect to CBM products, the co-cultured cell types can comprise adipose cells and muscle cells.

Various tissue engineering techniques can be applied, such as cell sheet engineering, cell fiber engineering, cell culture on a 3D-printed scaffold, and 3D cell printing for mimicking the structure characteristics of a natural animal meat product (AMP) such as a steak. Among those conventional techniques, 3D cell printing has emerged as the front runner due to its advantages of scalability and controllability of structure and composition.

Generally, conventional 3D printing methods can be an injection method for 3D printing or a single stroke layering method. Conventional injection 3D printing methods for use in preparing CBM products form flesh in a manner similar to snow accumulation and requires a third material to maintain the 3D shape. In this context, the most common type of conventional 3D injection printer employed uses a nozzle with a diameter of about 2 millimeters (mm) through which meat cells are sprayed onto a table and either the nozzle(s) move, the table beneath moves, or both move to create a thin film of meat cells (e.g., about 2 mm thick). These films (or layers) are then stacked on top of each other as they are formed, starting from the bottom.

Similar to in concrete construction where aggregates such as gravel are added to facilitate strength in the end product, inject 3D printing methods add meat cell ink, fatty cell ink, and scaffold particle ink to facilitate strength and maintain shape of the end product. When the printed product is incubated to mature and form tissue, the scaffold particle(s)

may serve as a nutritional supplement. However, because fat cells and meat cells have different viscosities, they must be ejected from different nozzles during this process as the difference in viscosity would clog the nozzles and significantly hinder the design.

In addition to requiring multiple nozzles, another challenge with this type of 3D printer is the process is not easily scaled. For example, a meat product (e.g., a steak) must be printed one at a time; the first must be complete before printing the next. Additionally, inkjet 3D printing requires atmospheric pressure. For example, if the room is negatively pressurized to reduce the risk of contamination (e.g., in a clean room or to comply with food production regulations and the like), the water in the fine ink utilized in the inkjet method will evaporate and the lightweight particles of fine ink can be swept away by the negative air flow (thus preventing operation of the method).

To address some of these issues, another type conventional 3D printer technique has been developed; the stroke stacking method. This 3D method utilizes multiple scanning nozzles that pass over a moving conveyor to draw the meat as if printing on paper. Similar to above, the meat cells and fat cells are sprayed from different nozzles; however, by positioning multiple 3D printers on a conveyor, a single meat product such as a steak is stacked as it advances along the conveyer.

In conventional stroke stacking methods of 3D printing, the size of the nozzle diameter determines the printing speed, with smaller nozzles producing less visible stacking marks, but taking longer to form, and larger nozzles producing shorter formation times but producing more visible stacking marks that, ultimately, can result in an unappetizing end product that does not resemble a natural AMP (e.g., the end product often has scanning lines present that are visible even after the meat is cooked). Similar to inkjet printing methods, stroke stacking methods also require a homogenous viscosity and particle size which restricts the number and type of components that can be employed in a single nozzle.

Both conventional 3D printing techniques expose the meat product (or components thereof) to air for a long period of time, which increases the risk of contamination for the end product. Further, as both methods utilize spraying techniques, there is a risk of air entrapment when the meat is sprayed from the nozzle such that the resulting meat product will contain air and likely contaminants. As noted above, conventional 3D printing methods also leave stacking marks from the nozzle and generally are not effective in reproducing chewy textures in the end product that are akin to the corresponding animal-based meat. Still further, as the cells sprayed from the nozzle rely on gravity to fall into place, these techniques are not suitable for zero or low gravity environments.

Figure 15:
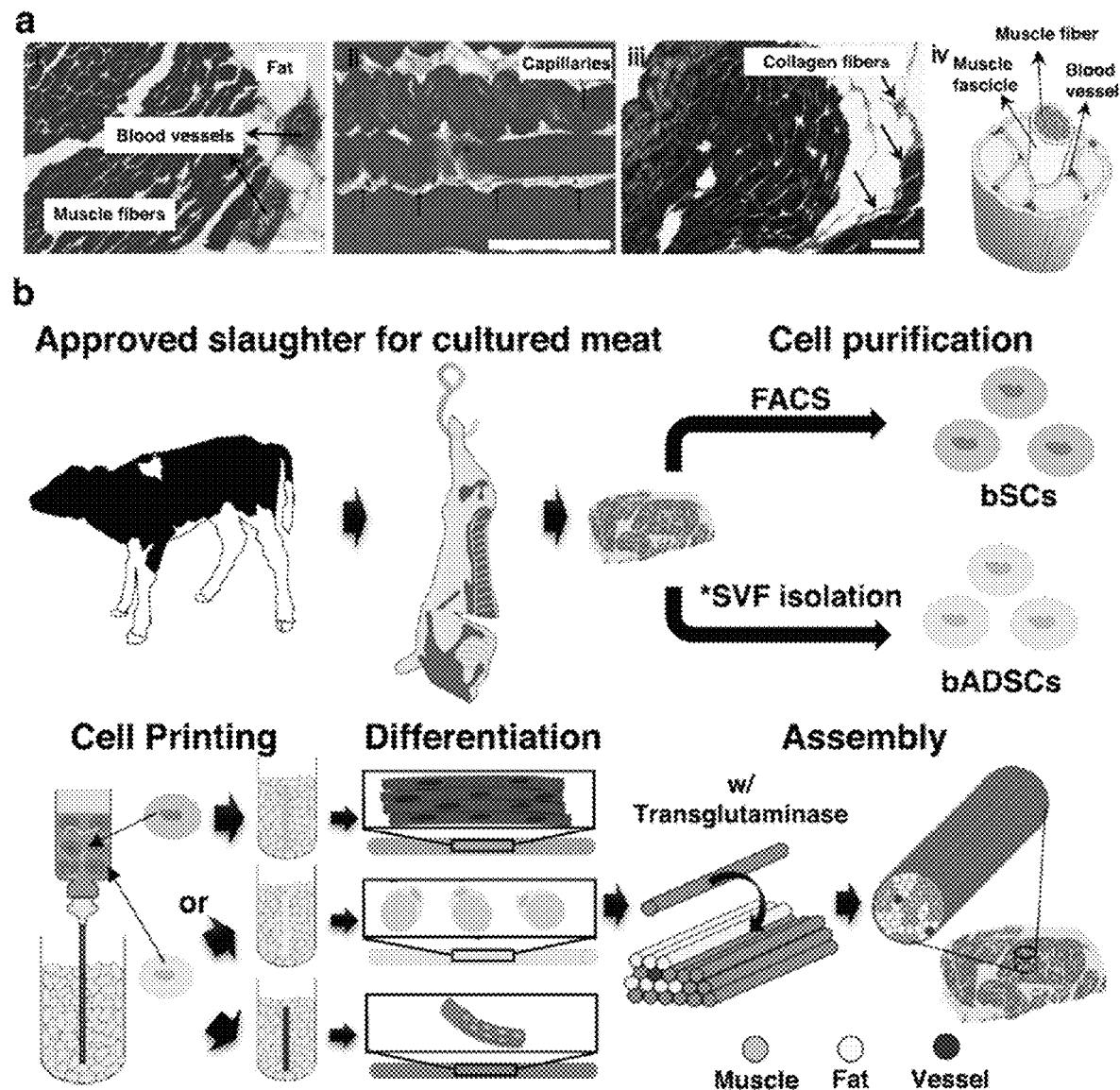
FIG. 15 shows an overview of at least one method for preparing a cell-based meat product, with FIG. 15a showing the structure of a steak (i, ii) H&E- and (iii) Azan-stained images of a piece of animal-based steak (representative images from three independent experiments are shown; all scale bars denote 100 µm, and (iv) schematic of a hierarchical structure in muscle.

FIG. 15 shows a general overview a conventional technique for producing a CBM product, described in Kang et al., *Engineered whole cut meat-like tissue by the assembly of cell fibers using tendon-gel integrated bioprinting*, Nature Communications 2021 (12): 5059, the contents of which are incorporated herein in their entirety by reference. There, a supporting bath-assisted 3D printing (SBP) technique is deployed. Ink is dispensed inside a gel or a suspension with thixotropic properties. When exposed to shear forces (e.g., when 3D printed), the viscosity of the gel or suspension decreases, which enables the ink to dispense through the gel. When the shear force is released, the material returns to a higher viscosity which then maintains the printed form.

A natural AMP typically has an aligned structure of skeletal muscle fascicles that are formed by assembled skeletal muscle fibers. Skeletal muscle fascicles in steak meat, for example, can have a diameter from around 900 μm to 2.3 mm (depending on the age and animal parts). The muscle fibers are covered with basement membrane and the muscle fascicles are surrounded by fat together with blood capillaries (see FIG. 15a). The component ratio and location of the muscle, adipose tissue, and blood capillaries can be significantly different according to the meat type and its location of origin. For example, red meat in the rump of Japanese Wagyu has been reported to have only 10.7% adipose tissues, whereas the sirloin of the Wagyu has been reported to have 47.5% adipose tissues. Accordingly, to produce a CBM product that appropriately resembles the appropriate AMP requires a method for assembling the different components of the meat (e.g., muscle, skeletal, blood vessel, and adipose fibers) in the desired locations, ratios, and amounts.

Referring back to FIGS. 9A-12B and the uniform distribution of pressure created across the barrel seal 70 in operation, it is important to highlight a unique and beneficial effect resulting from such design. When the extrudable material has fiber-like shapes (e.g., like certain clays and AMP or clean-meats and/or components thereof such as muscle cells or fibers) and it is subjected to shear force within the barrel 30 of the extrusion assembly 10, thixotropy occurs inside the extrudable material and such material changes from a solid phase to a liquid phase, which results in the soft, moldable extrusion material that can be extruded through the base cap opening 58. The devices, systems, and methods hereof can be used to leverage this concept and underlying principal in connection with the preparation of clean-meat muscle fibers and products and, in certain embodiments, in connection with the preparation of CBM muscle fibers and CBM products that exhibit AMP-like textures, density, and an overall natural AMP-like (appetizing) appearance.

For example, where the extrudable material comprises muscle fibers (whether natural or cell cultivated), when extruded from the extruder assembly 10, the vortex created within the barrel 30 can act to align the muscle fibers in a single direction. As is known in the relevant art, when muscle fibers (or fiber bundles) in meat are aligned in a single direction, this results in a tough, chewy meat. Conventional 3D printing techniques have consistently failed to achieve a chewy texture in CBM product because stacking cells in a 3D printer does not result in a single orientation of the fibers. However, use of the extruder assembly 10 of the present disclosure can overcome this challenge and result in an extruded meat or clean-meat product having fibers aligned in a single orientation and, thus, having a chewy or tougher texture. It should also be noted that the compression delivered by the piston disk 48 to the extrudable material acts to compress the extrudable material, resulting a denser extruded food product (as compared to those produced through a 3D printing methodology).

Figure 16:
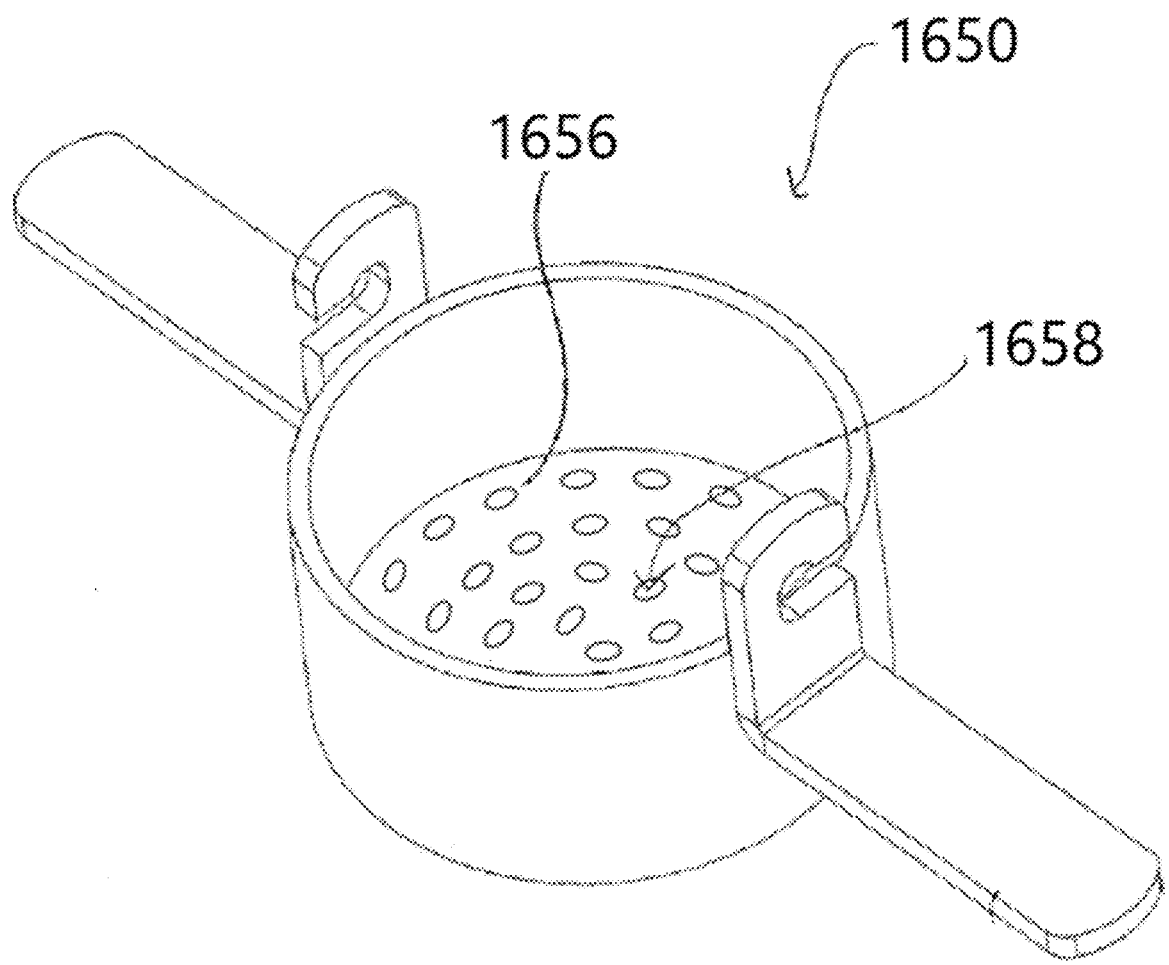
FIG. 16 is a perspective view of a base cap from an extrusion assembly according to certain embodiments of the present disclosure.

The extruder assembly 10 disclosed herein can further comprise specific components to facilitate production of extruded food products. For example, in at least one embodiment, the extruder assembly 10 further comprises a base cap 1650 that defines a plurality of openings 1658 in the bottom surface 1656 of the base cap 1650. Here, rather than being configured to accept a die, the openings 1658 themselves function as a die equivalent (in other words, the extrudable materials is forced through the openings 1658). FIG. 16 illustrates at least one embodiment of such a configuration.

Any number of openings 1658 can be employed and, in at least one embodiment, the base cap 1650 comprises at least fifty openings 1658, at least seventy-five openings 1658, or at least 100 openings 1658. The diameter of each opening 1658 can vary as well with all of the openings 1658 having the same diameter, a different diameter or a combination of the foregoing. In certain embodiments, the openings 1658 each have at least a 2 millimeters (mm) diameter, at least a 2.5 mm diameter, at least a 3 mm diameter, at least a 3.5 mm diameter, at least a 4 mm diameter, at least a 5 mm diameter, at least a 10 mm diameter, at least a 15 mm diameter, at least a 30 mm diameter. Any number of openings 1658 or diameter value(s) may be employed depending upon the desired application.

In certain embodiments, the base cap 1650 defines 100 openings 1658, each of which have a 3 mm diameter. In certain embodiments, the openings 1658 each have a diameter of at least 1 centimeter (cm). In certain embodiments, the openings 1658 each have a diameter of 1 cm, at least 2 cm, at least 3 cm, or at least 4 cm.

Figure 17A:
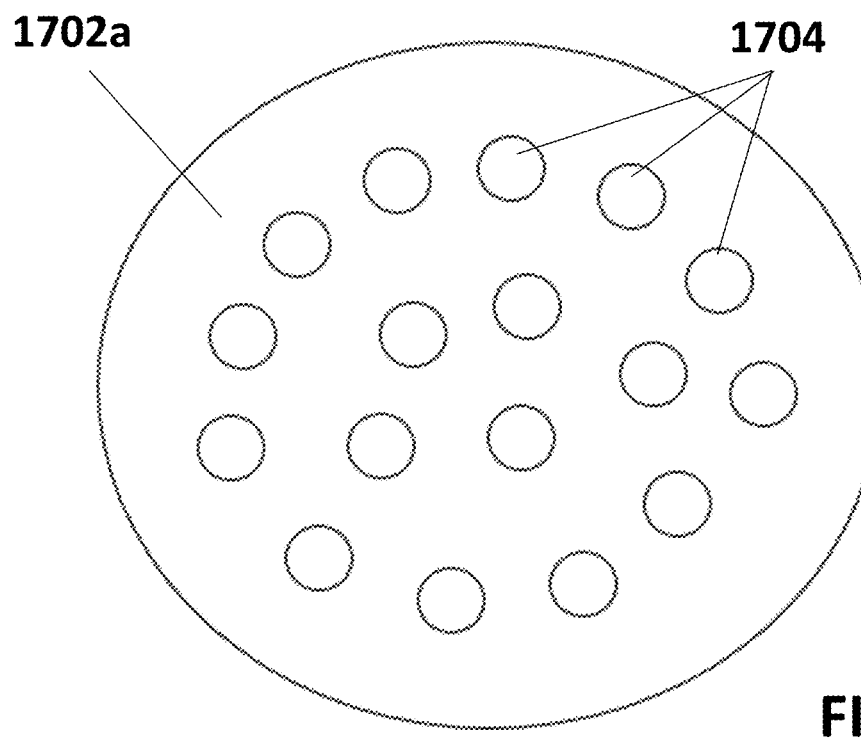
FIG. 17A and FIG. 17B are representations of a top view of various dies for use in the assembly of the present disclosure.
Figure 17B:
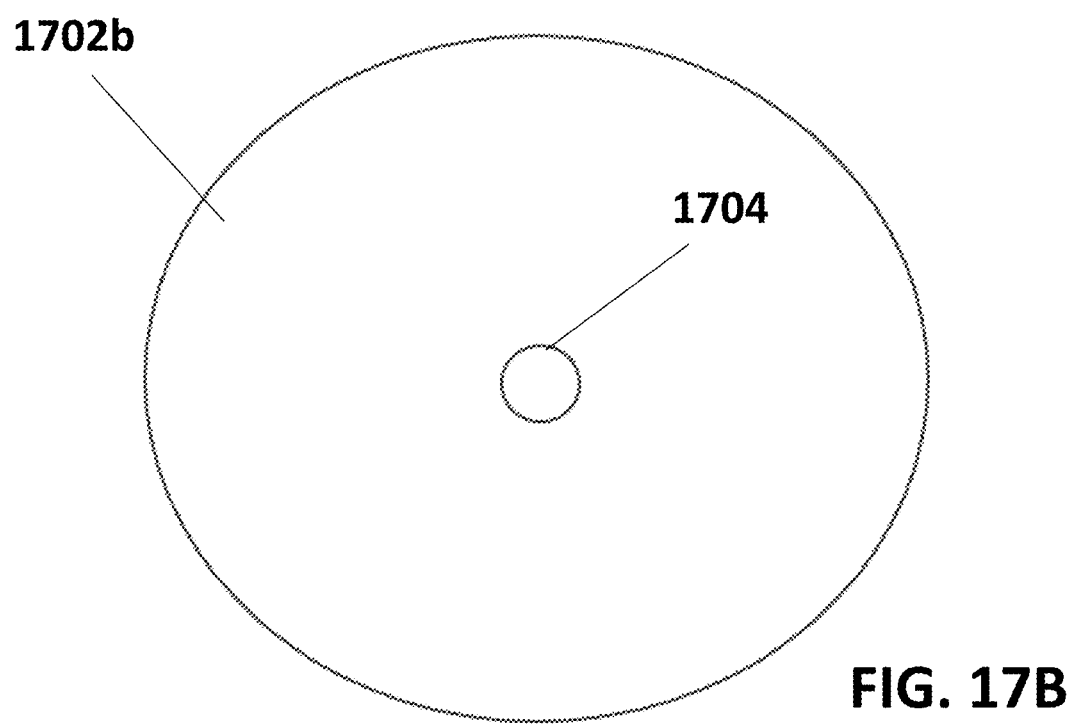
Figure 17C:
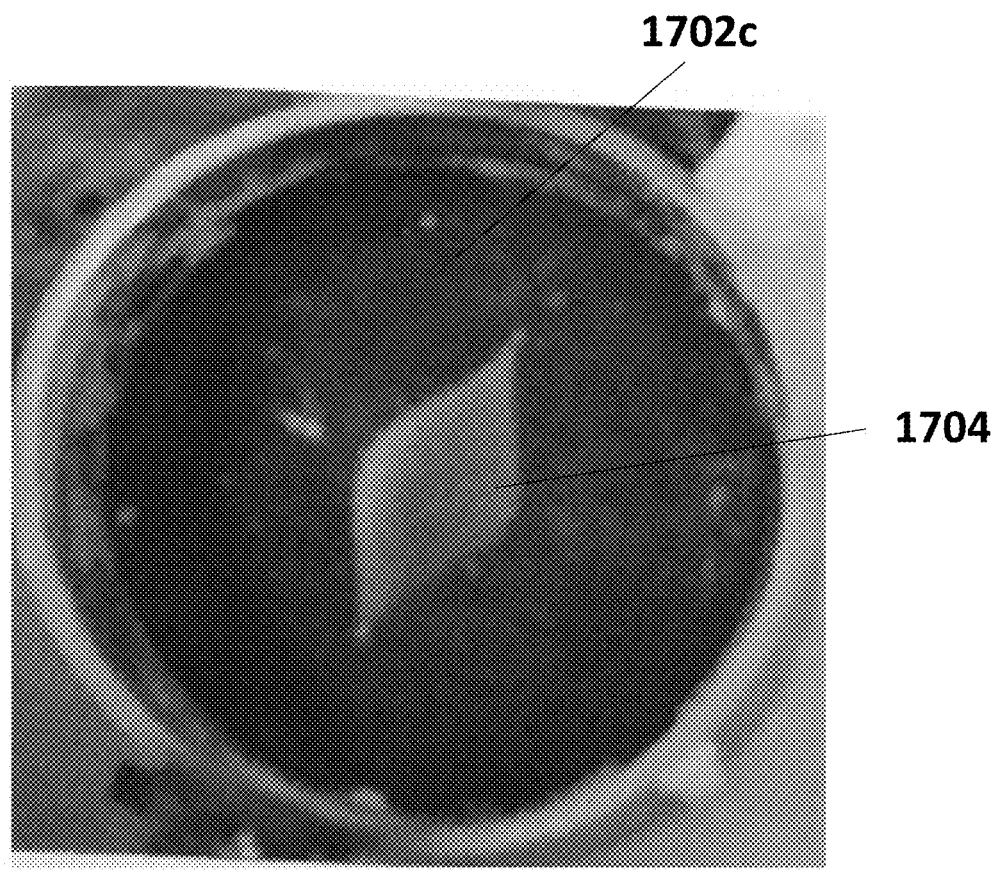
FIG. 17C is a photograph of a top view of a die for use in the assembly of the present disclosure, such die having an eye-like shape.

In certain embodiments, as previously described, the opening 58 in the bottom surface 56 of the base cap 50 accepts a die through which the extrudable material can be pushed through by the piston system 40. FIGS. 17A-17C show various embodiments of a die 1702 comprising at least one opening 1704 that can be employed where the extruder assembly 10 is used to produce extruded food products (or, for example, extruded meat components). There, the opening 58 in the bottom surface 56 of base cap 50 accepts the die 1702 (1702a, 1702b, 1702c) and, in use, the extrudable material is pushed through the one or more die openings 1704 by the piston system 40.

As shown in FIGS. 17A-17C, the die 1702a, 1702b, 1702c can comprise a plurality of die openings 1704 (FIG. 17A) or a single die opening 1704 (FIG. 17B, FIG. 17C). Any number of die openings 1704 can be employed and, in at least one embodiment, die 1702a comprises at least fifty die openings 1704, at least seventy-five die openings 1704, or at least 100 die openings 1704. The diameter and shape of each die opening 1704 can vary between all of the die openings 1704. Indeed, two or more die openings 1704 can have the same diameter, different diameters, different shapes, or any combination of the foregoing. In certain embodiments, the die openings 1704 each have at least a 2 mm diameter, at least a 2.5 mm diameter, at least a 3 mm diameter, at least a 3.5 mm diameter, at least a 4 mm diameter, at least a 5 mm diameter, at least a 10 mm diameter, at least a 15 mm diameter, at least a 30 mm diameter. In certain embodiments, the die openings 1704 each have a diameter of at least 1 cm. In certain embodiments, the die openings 1704 each have a diameter of 1 cm, at least 2 cm, at least 3 cm, or at least 4 cm. Any number of die openings 1704, shapes, or diameter value(s) may be employed depending upon the desired application.

In certain embodiments, the die 1702 defines 100 die openings 1704, each of which have a 3 mm diameter. In certain embodiments, the die 1702 defines a single die opening 1704 with at least a 5 cm diameter at its largest section and comprises an eye-like shape (see FIG. 17C).

Where the openings 1658 or die opening(s) 1704 comprise a smaller diameter (e.g., 3 mm), the extruder assembly 10 can be used to produce muscle fibers and the like. These products can then be combined into a sheet of muscle fibers and stacked in a particular orientation (with other components or alone) as described above and subjected to the extruder again, or the extruded fibers can be the end product.

Figure 18:
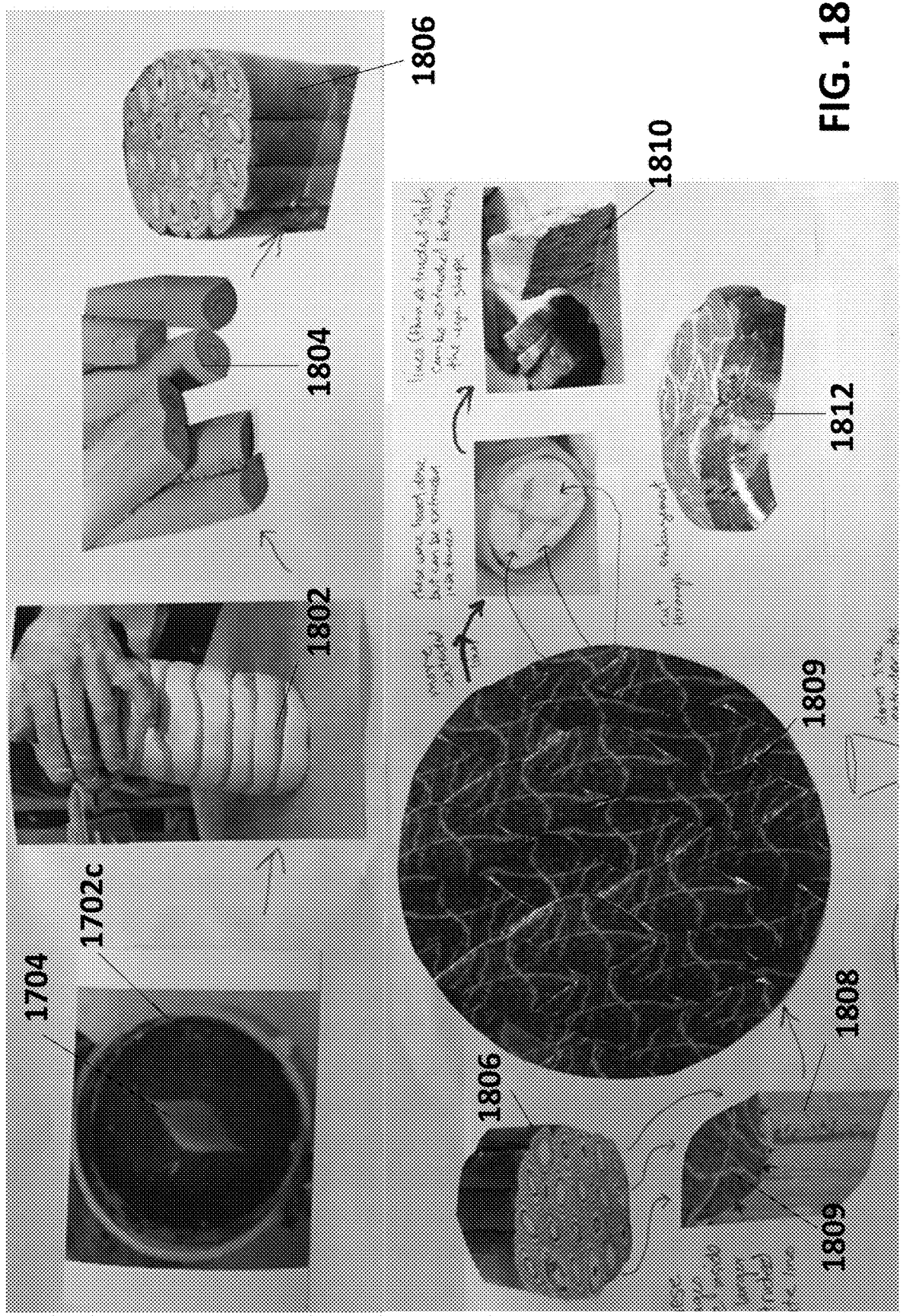
FIG. 18 shows a photograph diagram of extrudable material at various stages of extrusion using the meat production systems and methods of the present disclosure.
Figure 18:
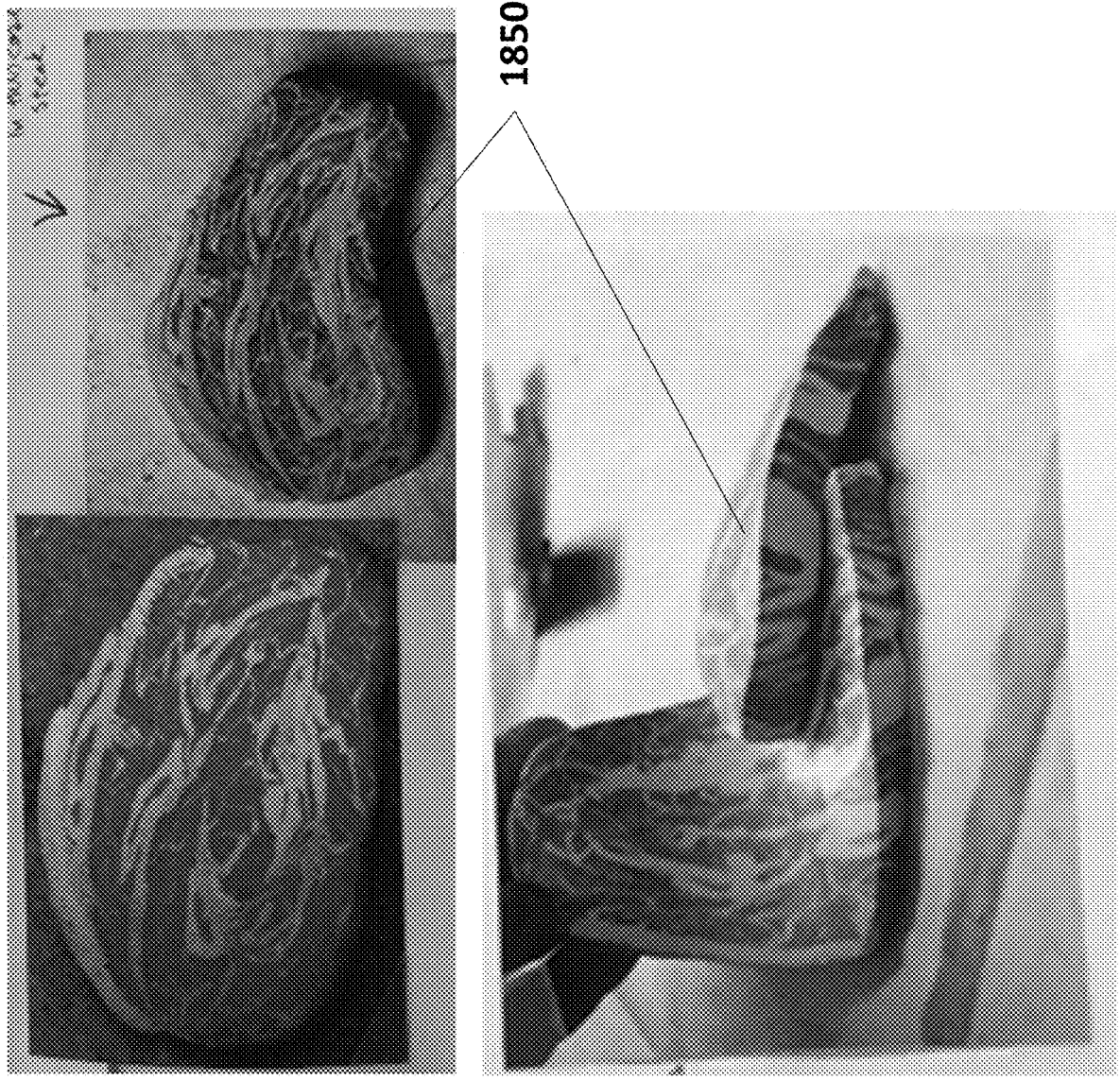

FIG. 18 shows a step-by-step process of the preparation of a representative extruded food product 1812 (here, by way of a non-limiting example, an extruded food product 1812 that resembles a cut of beef steak that is formed from representative clay samples having similar properties, wherein the darker clay represents a muscle cell medium and the lighter clay represents fatty particle medium such as, for example, adipose cells or tissue). Initial material (food block 1802) comprises a repeated stacking design that results in an extruded product that closely resembles a natural ABM (i.e. steak) with marbling (or intramuscular fat) when prepared and extruded using extruder assembly 10 in accordance with the principles described herein. For example, the various layers (each formed of or comprising plant matter, meat, a CBM product, meat cells/tissue, fatty particles (e.g., lipid particles, adipose cells and/or tissue, etc.), skeletal cells/tissue, nutritional additives, etc.) can be stacked as desired, with each pre-layer comprising one or more layers and/or components.

In certain embodiments, a first layer comprises a single material throughout. In certain embodiments, a first layer comprises a muscle cell medium further comprising fatty particles. In certain embodiments, a second layer comprises a fatty particle (e.g., lipid particles, adipose cells and/or tissue, etc.) medium further comprising functional nutrients (e.g., one or more vitamins, minerals, or other nutritional additives) dispersed therein. In certain embodiments, a first layer comprises a first material (e.g., muscle cell medium through which muscle fibers are dispersed) having a first thickness (e.g., about 8 mm thick), and a second layer comprising a second material (e.g., a fatty particle medium) having a second thickness (e.g., about 8 mm thick or about 5 mm thick). However, to achieve the desired marbled effect, a first layer need only have a single layer comprising a material.

Furthermore, it will be noted that the design of a layer can comprise any design as previously described in connection with the embodiments shown at least in FIGS. 9A-9C, even a previously extruded pattern.

Referring back to FIG. 18, food stack 1802 is the initial material that is positioned within the volume 62 of the barrel 30, where the barrel seal 70 (not shown) is positioned at least partially within the barrel 30 (not shown) and above the extrusion material/food stack 1802, and downward force is applied to the barrel seal 70 and extrusion material via the piston system 40. Notably, the barrel seal 70 comprising lip 74 enables consistent and predictable pressure and flow within the volume 62 of the extrudable material. However, at or near the bottom edge 34 of the barrel 30, the base cap 50, a vortex is formed by virtue of the opening 58 and die in the bottom of the base cap 50 that the extrudable material is pushed through. This vortex promotes a thixotropic response in the extrudable material (e.g., where it comprises a meat, a CBM product, a CBM component, adipose tissue or cells, etc.), which results in a core region of the extrudable material to flow faster than a lateral portion of the extrudable material (i.e. that portion closer to the inner surface 38 of the barrel 30) adjacent thereto as the extrudable material is forced through the die (e.g. die opening 1704). The vortex, thixotropic properties of the extrudable material, and the consistent downward force and no-leak design of the barrel seal 70 and lip 74, together with the elimination of any bottom gap 62 via the sealing rings 80, allows for a consistent exit of extrudable material through the die in a very unique, intricate, clear, and consistent pattern of materials. After exiting the assembly through the die, the extruded material 1804 comprises a repeating detailed patterns within its horizontal cross-sections. Notably, these patterns are all distinct and clear (see, e.g., extruded stack 1806) which is entirely unlike any other design that is conventionally achievable using conventional extruders.

As previously described, the patterns, and occurrence thereof, repeat depending on how the various materials and layers are organized and/or stacked within the food stack 1802/initial material.

Once initially extruded, the extruded material 1804 can be sliced and/or arranged and/or further processed as desired. For example, in at least one embodiment, the slices may comprise between about a 0.1 mm-5 cm thickness.

In certain embodiments, the extruded materials 1804 are compiled into an extruded stack 1806 as shown in FIG. 18 for further processing. For example, as shown in FIG. 18, the extruded stack 1806 can be extruded through the extruder assembly 10 as previously described. Images 1809 show cross-sectional views of the extruded stack 1806 taken from within one of the lighter portions and illustrate how the process can create a marbling-like effect throughout the extruded material 1804. Extruded slab 1810 illustrates the same and, in this case, the extruded material was sliced into sections. Extruded slab 1812 shows yet another example of a sliced extruded material prepared according to the present disclosure and illustrates the density that is achievable in the end product, as well as how the various materials are integrated throughout the end product in a realistic fashion. Finally, FIG. 18 also illustrates three representative samples 1850 of beef-steak shaped extruded material (and a cross-section thereof) that were prepared using the methods and devices disclosed herein and closely resemble a natural ABM beef steak, complete with adipose marbling.

It may be desirable to deair and/or compress the resulting extruded material 1804. Such deairing and/or compression can be achieved using methods commonly known in the art including, without limitation, processing the slices and/or pre-cut extruded material 1802/stacked extruded material 1806 in a deairing chamber coupled with a deairing apparatus.

Figure 19A:
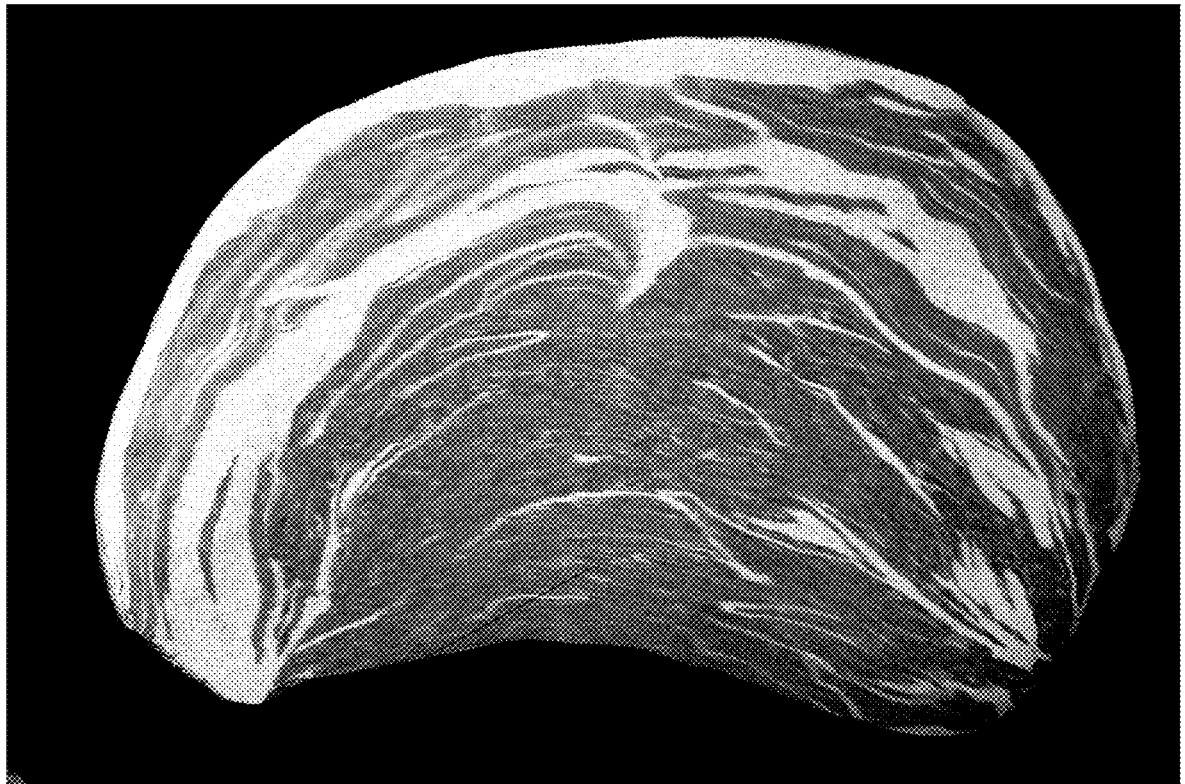
FIGS. 19A-19B show photographs of meat products produced using the extruder assembly and methods of the present disclosure.
Figure 19B:
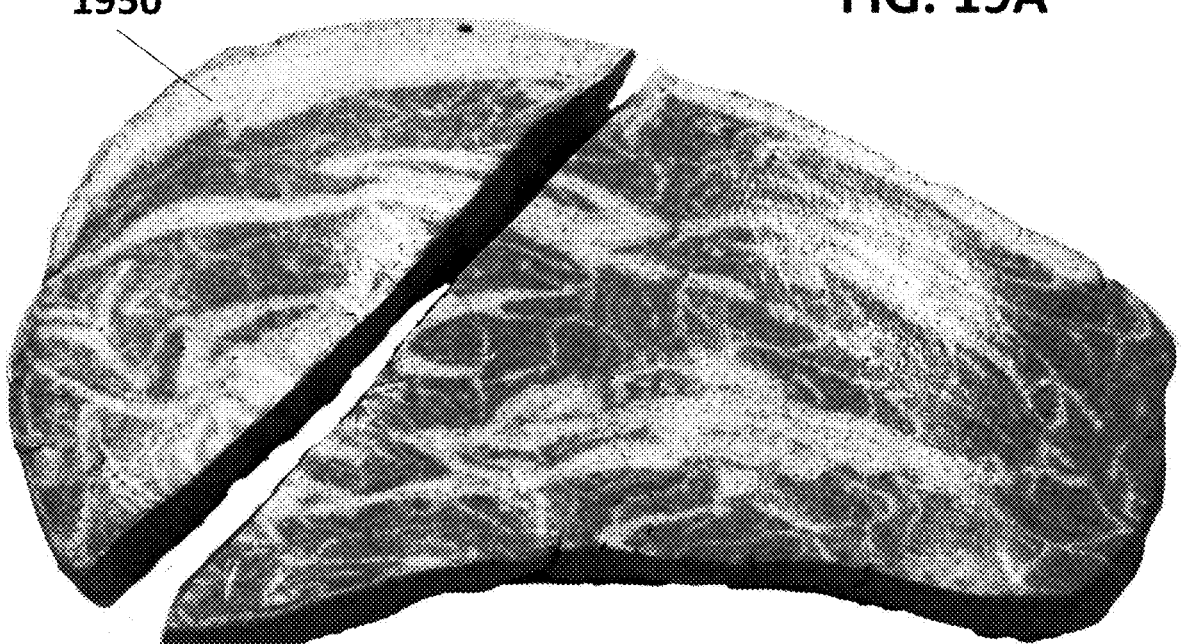

FIGS. 19A and 19B show photographs of various samples 1950 produced using the stacking methods and extruder assembly 10 of the present disclosure. As can be seen, various marbling patterns can be achieved in the extruded products (depending on how layers are stacked, oriented, etc. in the starting extrudable material). Further, these images support that the fibers of the extrudable material are aligned in a like orientation when subjected to the vortex created within the extruder body.

In certain embodiments, a method of producing a food product using at least one extruder assembly 10 of the present disclosure is provided. Such method can also be performed using an industrial system comprising a plurality of the extruder assemblies 10 working in concert or otherwise. For example, where extruded material from a first group of extruder assemblies 10 is fed into a second group of extruder assemblies 10 for additional processing.

In certain embodiments, a method of producing a food product using at least one extruder assembly 10 comprises placing material in a feed end of the barrel 30 of the extruder assembly 10 and placing the body 72 in the feed end of the barrel 30 adjacent to the material such that the body 72 is behind the material relative to the extrusion end. The material can comprise any extrudable food-based material including, for example, plant matter, meat or components thereof (including cell-cultured meat, skeletal tissue, blood vessels, etc.), fatty particles, additives, excipients, carriers, binders, and/or nutritional additives such as one or more vitamins, minerals, fiber, or other nutrient-based additives. In certain embodiments, the material comprises a first muscle cell medium comprising a plurality of muscle fibers.

Force is then applied to the first planar end of the body 30 to extrude the material from the end of the barrel 30 through an extrusion die (e.g., 1702) attached to an extrusion end of the barrel 30, and a vortex is created within a core region of the material within the barrel 30. Where the material comprises a fiber-based material (e.g., comprises muscle fibers), creating the vortex within the core region substantially aligns the plurality of fibers within the extruded material in a common orientation. In certain embodiments, the extruded material is a cell-based meat product. In certain embodiments, the extruded material visually resembles a beef steak and has mouthfeel characteristics (i.e. a texture and density) similar thereto. The method can further comprise the step of slicing the extruded material into segments (e.g., steaks having a desired thickness). In certain embodiments, the method further comprises de-airing the segments; compressing the segments; or both de-airing and compressing the segments.

The material to be extruded can comprise at least a first layer and a second layer stacked together as described herein. It will be appreciated that any number of layers can be utilized including, without limitation, a plurality of first and second layers, each stacked together in a repeating pattern. In certain embodiments, the material further comprises at least a third layer comprising skeletal tissue and/or a fibrous tissue medium (e.g., comprising skeletal tissue, cells, fascia, or the like).

In certain embodiments, the first layer comprises at least a first muscle cell medium arranged in a first configuration and a second layer comprising at least a fatty particle medium arranged in a second configuration. A fatty particle medium can comprise adipose cells or tissue, lipids, and/or the like. In certain embodiments, the fatty particle medium comprises a variety of fatty particles having a variety of sizes/diameters. In certain embodiments, the fatty particle medium further comprises one or more nutritional additives such as one or more vitamins, minerals, fiber, or other nutrient-based additives.

The material to be extruded can be room-temperature, frozen, or semi-frozen. It will be understood that, in food production, it may be desirable for the initial material to be frozen to reduce contamination risks, for example.

Extruded food products are also provided. In certain embodiments, the extruded food product comprises at least a first material comprising a cultured muscle cell medium comprising muscle fibers positioned in a substantially common orientation and at least a second material comprising fatty particles. In certain embodiments, the first material can further comprise a reinforcing substance that stiffens the muscle fibers as compared to their native/wild-type state.

The first and second materials can define at least a central pattern on the extruded food product as shown herein (see, e.g., FIGS. 18, 19A, and 19B). In certain embodiments, the second material can be streaked, distributed, or both throughout the first material in a manner that resembles distribution of intramuscular fat (i.e. marbling) in a meat product derived from a natural animal.

This central pattern can be created by the vortex effect within the barrel 30 when the extruder assembly 10 is operated (as described above). For example, when the first and second materials are disposed in a first stacked arrangement, subjected to a vortex created within an extrusion end of an extruder device, and extruded through a die in the extrusion end of the extruder device to result in an extruded body, it can result in the marbled appearance shown in at least FIGS. 18, 19A, and 19B.

In certain embodiments, the second material is dispersed throughout the first material due to the vortex effect and thixotropy. For example, where the second material comprises fatty particles, the fatty particles are dispersed throughout the first material (e.g., a cultured cell meat medium).

The first and/or second materials of the extruded food product can further comprise a reinforcing substance such as collagen, other binding proteins, or as otherwise may be known in the relevant arts or hereinafter determined. For example, cellulose nanofibers, chitosan nanofibers, and others can additionally be employed. Where the material comprises muscle fibers, the reinforcing substance can act to stiffen the muscle fibers where employed. Additionally or alternatively, the first and/or second materials of the extruded food product can comprise one or more nutritional additives.

In certain embodiments, the extruded food product further comprises a third material comprising skeletal tissue such as fascia.

In certain embodiments, the first material can comprise at least a cultured muscle cell medium comprising muscle fibers and fatty particles. There, the fatty particles can comprise a stiffness characteristic different than the stiffness characteristic of the muscle fibers. In certain embodiments, the fatty particles can be softened (e.g., by heating) prior to loading into the barrel 30. Where the melting point of the fatty particles is lower than that of the cultured muscle cell medium, the muscle cell medium may be unaffected by an increase in temperature while the fatty particles soften if the extrudable material is heated. The same is also true in reverse; the fatty particles will harden more quickly than the cultured muscle cell medium. It will be appreciated that temperature can be modified of the extrudable material prior to extrusion to achieve a desired outcome.

While various embodiments of the present disclosure have been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A method of producing a food product, the method comprising:
   providing at least one extruder system, each of the at least one extruder systems comprising:
      a barrel having a barrel width structured to contain and pass an extrudable material,
      a piston assembly comprising a piston structured to fit at least partially within the barrel, the piston assembly configured to push the extrudable material through the barrel upon activation, and
      a body disposed within the barrel between the extrudable material and the piston, wherein the body comprises a first planar end and an opposing second planar end, the first planar end being substantially parallel to the second planar end, and a lip extending radially from the body at the second planar end to define an edge, the edge defining a first width and the lip comprising a resilient material,
      wherein the body supports the lip enabling the edge of the lip to flex, the first width is substantially equivalent to the barrel width, and when inward pressure is applied to an extrudable material positioned within the barrel by movement of the piston, a vortex is created within the extrudable material flowing in a direction of an extrusion die attached to an extrusion end of the barrel;
   placing a food-based material in a feed end of the barrel of the extruder system;
   placing the body in the feed end of the barrel such that the body is behind the food-based material relative to the extrusion end of the barrel;
   applying a force to the first planar end of the body to extrude the food-based material from an end of the barrel through the extrusion die to activate thixotropy of the material; and
   generating the vortex toward the extrusion die within the barrel such that, when forces applied to the food-based material are released due to the food-based material exiting the extrusion die to result in an extruded product, an internal structural image is present in the extruded product such that when sliced, the extruded product is shaped to simulate marbling of meat derived from a natural animal.

2. The method of claim 1, wherein applying force to the first planar end of the body comprises activation of the piston assembly through application of compressed air.

3. The method of claim 1, wherein the food-based material further comprises a cell-based meat product.

4. The method of claim 1, wherein the extruded product comprises at least a first layer and a second layer stacked together, the first layer comprising at least a first muscle cell medium arranged in a first configuration and the second layer comprising at least a second fatty particle medium arranged in a second configuration.

5. The method of claim 4, wherein the material further comprises a third layer comprising a fibrous tissue medium.

6. The method of claim 4, wherein the material comprises a plurality of the first and second layers, each set of the first and second layers stacked together in a repeating pattern.

7. The method of claim 1, the method further comprising the steps of slicing the extruded product into segments.

8. The method of claim 7, further comprising (a) de-airing the segments; (b) compressing the segments; or (c) both (a) and (b).

9. The method of claim 1, wherein the material is frozen or semi-frozen.

10. The method of claim 1, wherein the material comprises plant matter, meat or components thereof, fatty particles, additives, excipients, carriers, binders, and/or nutritional additives.

* * * * *